United States Patent
Nakabayashi

(10) Patent No.: US 8,922,932 B2
(45) Date of Patent: Dec. 30, 2014

(54) POWER SUPPLY CIRCUIT

(71) Applicant: Rohm Co., Ltd, Kyoto (JP)

(72) Inventor: Hirotaka Nakabayashi, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 14/259,294

(22) Filed: Apr. 23, 2014

(65) Prior Publication Data

US 2014/0313608 A1    Oct. 23, 2014

(30) Foreign Application Priority Data

Apr. 23, 2013   (JP) ................ 2013-090442

(51) Int. Cl.
    *G11B 15/12*     (2006.01)
(52) U.S. Cl.
    USPC .......................................... 360/61; 323/271
(58) Field of Classification Search
    None
    See application file for complete search history.

(56) References Cited

U.S. PATENT DOCUMENTS

2009/0224732 A1    9/2009  Kudo et al.
2010/0277143 A1    11/2010 Kudo et al.

FOREIGN PATENT DOCUMENTS

| JP | 2002-335145 | 11/2002 |
| JP | 2009-219184 | 9/2009 |
| JP | 2012-156826 | 8/2012 |

*Primary Examiner* — Paul Huber
(74) *Attorney, Agent, or Firm* — Fish & Richardson P.C.

(57) ABSTRACT

Each of unit blocks (UB1, UB2) is provided with an output circuit (20) including a serial circuit of FETs (21) and (22). A power supply circuit (1b) can operate in a first mode for generating an output voltage (Vo) using only one of the output circuits (20) or in a second mode for generating the output voltage (Vo) using two output circuits (20) by synchronous/parallel driving. When switching from the first mode to the second mode, start of the synchronous/parallel driving from a state where the FET (22) on the low voltage side is turned on is inhibited (start of the synchronous/parallel driving is waited until the FET (21) on the high voltage side is turned on).

14 Claims, 20 Drawing Sheets

FIG. 9

| UB1_EN | PARALELL | REAL OPERATION MODE |
|---|---|---|
| Lo | ARBITRARY | STOP |
| Hi | Hi | FIRST MODE |
| Hi | Hi | SECOND MODE |

| IN1 | IN2 | Q |
|-----|-----|-----|
| Lo | Lo | Lo | ← FIRST STATE
| Hi | Lo | Lo |
| Lo | Hi | Lo |
| Hi | Hi | Hi | ← SECOND STATE
| Lo | Hi | Hi |
| Hi | Lo | Lo |
| Lo | Lo | Lo | ← FIRST STATE

POWER SUPPLY CIRCUIT

CROSS-REFERENCE TO RELATED APPLICATIONS

This application is based on Japanese Patent Application No. 2013-090442 filed on Apr. 23, 2013, the contents of which are hereby incorporated by reference.

BACKGROUND OF THE INVENTION

1. Field of the Invention

The present invention relates to a power supply circuit.

2. Description of Related Art

A power supply circuit illustrated in FIG. 19 uses an output circuit 910 including a serial circuit of a high side FET disposed on a high voltage side and a low side FET disposed on a low voltage side, so as to generate an output voltage Vo' from an input voltage. In the power supply circuit illustrated in FIG. 19, each FET is controlled to turn on and off based on a feedback voltage VFB' corresponding to the output voltage Vo'.

In this case, as illustrated in FIG. 20, the feedback voltage VFB' is compared with each of voltages (VREF'+$\Delta$V) and (VREF'−$\Delta$V), and the FETs are controlled to turn on and off based on the comparison results so that the output voltage Vo' can be stabilized to a desired voltage corresponding to the reference voltage VREF'.

Note that there are following technical documents related to the present invention: (1) JP-A-2009-219184, (2) JP-A-2012-156826, and (3) JP-A-2002-335145.

A load of a power supply circuit sometimes requires large current. For instance, when a signal processor configured to perform signal processing on data of a magnetic disk is a load of the power supply circuit, the signal processor requires large current particularly in reading and writing data. On the contrary, there are cases where the signal processor does not require large current. In view of this situation, it is considered to prepare two output circuits 910 illustrated in FIG. 19 to be connected in parallel. When small current is required, only one output circuit 910 is used to generate the output voltage Vo' (hereinafter referred to as single driving). When large current is required, two output circuits 910 are driven in parallel to generate the output voltage Vo'. However, it is necessary to consider so that stable operation of the load is not disturbed when switching from the single driving to the parallel driving (for example, consideration for preventing a transient drop of the output voltage).

In addition, if a hysteresis voltage $\Delta$V can be accurately generated in FIG. 20, an accuracy of the output voltage is improved (the output voltage Vo' is identical to the desired voltage with high accuracy). The improvement of the output voltage accuracy also contributes to the stable operation of the load.

SUMMARY OF THE INVENTION

Therefore, it is an object of the present invention to provide a power supply circuit contributing to stable operation of a load (for example, by suppressing a transient decrease of an output voltage or by improving an output voltage accuracy).

A first power supply circuit according to the present invention is a power supply circuit for generating an output voltage from an input voltage, including a plurality of output circuits each of which includes a serial circuit of a first switching element connected to a terminal to which the input voltage is applied and a second switching element connected to a reference potential line, and is capable of generating a voltage to be a base of the output voltage from a node between the first and second switching elements, and a control circuit configured to control ON/OFF of the first and second switching elements of each output circuit based on a feedback voltage corresponding to the output voltage. The control circuit operates in one of a plurality of modes including a first mode in which only a first output circuit is used between the first and second output circuits included in the plurality of output circuits for generating the output voltage and a second mode in which the first and second output circuits are used for generating the output voltage. When changing from operation in the first mode to operation in the second mode, start of the operation in the second mode in a state where the second switching elements of the output circuits are turned on is inhibited.

In addition, a second power supply circuit according to the present invention is a power supply circuit for generating an output voltage from an input voltage, including an output circuit including first and second switching elements connected in series to each other to which the input voltage is applied, configured to generate a voltage to be a base of the output voltage from a node between the first and second switching elements, a reference voltage generation circuit configured to generate a reference voltage, a comparing circuit configured to generate a first comparison result signal indicating a comparison result between a voltage higher than the reference voltage by a predetermined first hysteresis voltage and a feedback voltage corresponding to the output voltage, and a second comparison result signal indicating a comparison result between a voltage lower than the reference voltage by a predetermined second hysteresis voltage and the feedback voltage, and a control circuit configured to control ON/OFF of the first and second switching elements based on the first and second comparison result signals. In the comparing circuit, the reference voltage is applied to control terminals of first and third transistors, while the feedback voltage is applied to control terminals of second and fourth transistors, and constant current is supplied to each of the first to fourth transistors via a resistor so as to generate first to fourth voltages, which are used for generating the first and second comparison result signals.

Note that other features, elements, steps, advantages, and characteristics of the present invention will become more apparent from the following description of embodiments with reference to the attached drawings.

BRIEF DESCRIPTION OF THE DRAWINGS

FIG. 9 is a table showing a relationship between signals and real operation modes according to the third embodiment of the present invention.

DETAILED DESCRIPTION OF THE PREFERRED EMBODIMENTS

Figure 1:
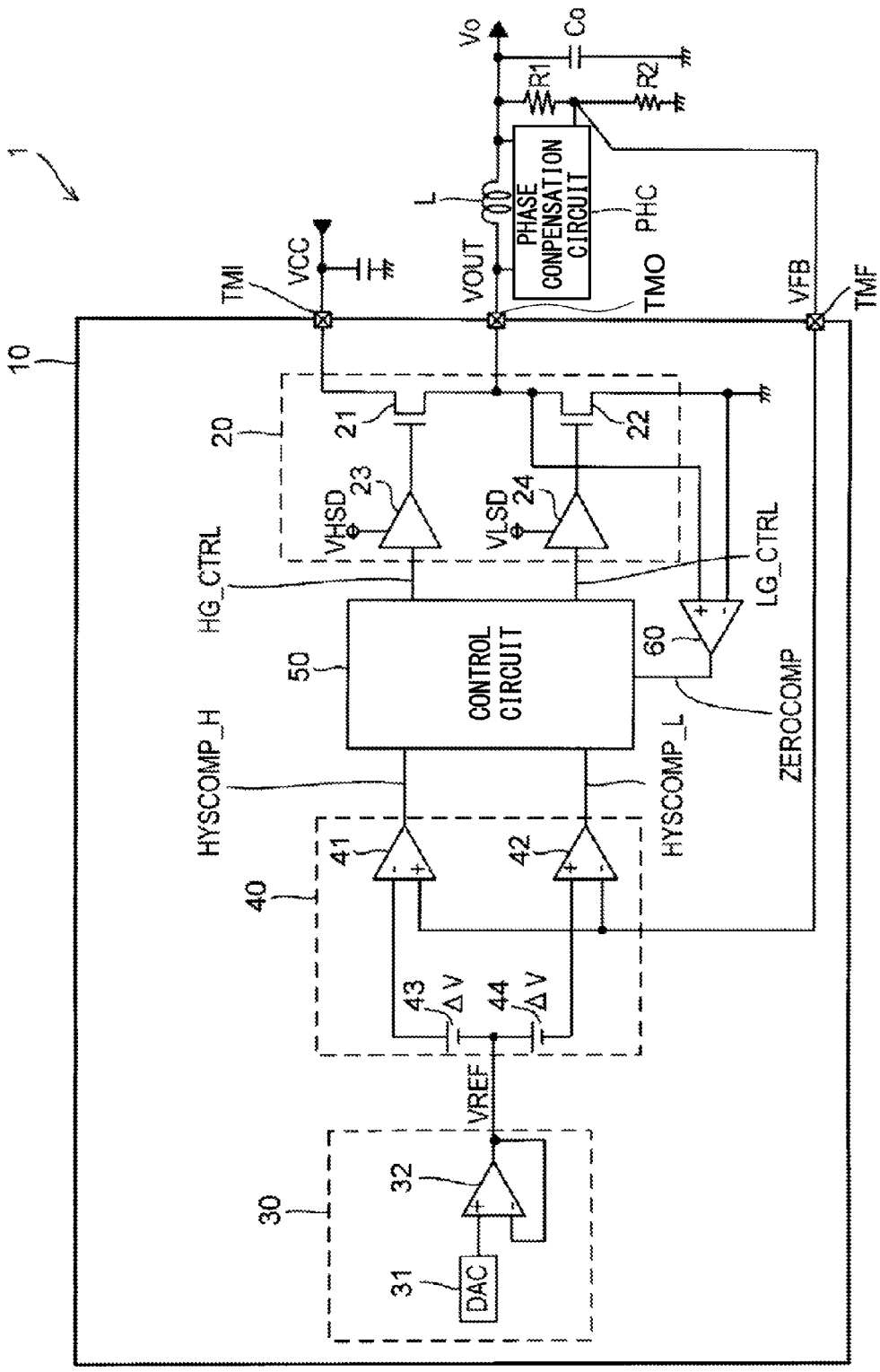
FIG. 1 is a schematic diagram of a power supply circuit according to a first embodiment of the present invention.

Now, embodiments of the present invention are described specifically with reference to the drawings. In the drawings, the same part is denoted by the same numeral or symbol so that overlapping description is omitted as a rule. Note that in this specification, for simple description, when a numeral or a symbol denoting information, a signal, a physical quantity, a state quantity, a member, or the like is referred to, the name of the information, the signal, the physical quantity, the state quantity, the member, or the like corresponding to the numeral or the symbol may be omitted or abbreviated.

First Embodiment

A first embodiment of the present invention is described. FIG. 1 is a schematic diagram of a power supply circuit 1 corresponding to the first embodiment of the present invention. The power supply circuit 1 generates from a DC input voltage a DC output voltage having a voltage value different from that of the input voltage. It is possible to consider that VOUT described later is the output voltage, but it is considered here that Vo described later is the output voltage. The input voltage is denoted by VCC. The input voltage VCC and the output voltage Vo are positive voltages. However, it is possible to modify the structure of the power supply circuit 1 so that the input voltage VCC and the output voltage Vo are negative voltages (the same is true in other power supply circuits described later). In addition, a potential to be a reference of individual voltages such as the input voltage VCC and the output voltage Vo is referred to as a reference potential, and a wiring, a metal layer, or a node having the reference potential is referred to as a ground (reference potential line). The reference potential is 0 V (volts).

The power supply circuit 1 includes individual parts illustrated in FIG. 1. Specifically, the power supply circuit 1 includes an IC 10 as a semiconductor integrated circuit, an inductor L, voltage dividing resistors R1 and R2, an output capacitor Co, and a phase compensation circuit PHC.

The IC 10 has a terminal TMI to which the input voltage VCC is applied, a terminal TMO to which the voltage VOUT is applied to be a base of the output voltage V0, and a terminal TMF to which a feedback voltage VFB is applied corresponding to the output voltage Vo. Further, The IC 10 includes an output circuit 20, a reference voltage generation circuit 30, a comparing circuit with hysteresis 40, and a control circuit 50. In addition, a comparator 60 is also disposed in the IC 10.

The output circuit 20 includes a serial circuit of a switching element 21 connected to the terminal TMI and a switching element 22 connected to the ground, and outputs the voltage VOUT to be a base of the output voltage Vo from the node between the switching elements 21 and 22. The switching elements 21 and 22 may be arbitrary semiconductor switching elements, but each of the switching elements 21 and 22 is an N-channel metal-oxide-semiconductor field-effect transistor (MOSFET) in this example. Hereinafter, the switching elements 21 and 22 are referred to as FETs 21 and 22. Note that FETs 21 and 22 may also be referred to as a high side FET and a low side FET, respectively. Specifically, the drain of the FET 21 is connected to the terminal TMI, the source of the FET 21 is connected to the drain of the FET 22 and is also connected to the terminal TMO. The source of the FET 22 is connected to the ground. The gates of the FETs 21 and 22 are respectively supplied with gate control signals HG_CTRL and LG_CTRL from the control circuit 50. In reality, the control signals HG_CTRL and LG_CTRL are supplied to the gates of the FETs 21 and 22 respectively via gate drivers 23 and 24 disposed in the output circuit 20. VHSD and VLSD denote driving voltages for the gate drivers 23 and 24, respectively.

The reference voltage generation circuit 30 generates a predetermined reference voltage VREF. Specifically, the generation circuit 30 includes a DAC 31 constituted of a D/A converter or the like so as to output a predetermined reference voltage VREF, and an amplifier 32 for low impedance output of the reference voltage VREF supplied from the DAC 31. In the amplifier 32, the noninverting input terminal is supplied with the reference voltage VREF outputted from the DAC 31, and the inverting input terminal is connected to the output terminal. Therefore, the amplifier 32 works as a voltage follower.

The comparing circuit with hysteresis 40 is applied with the reference voltage VREF from the output terminal of the amplifier 32 and the feedback voltage VFB via the terminal TMF. The comparing circuit 40 compares a voltage higher than the reference voltage VREF by a predetermined first hysteresis voltage with the feedback voltage VFB so as to output a signal HYSCOMP_H indicating the result of the comparison, and compares a voltage lower than the reference voltage VREF by a predetermined second hysteresis voltage with the feedback voltage VFB so as to output a signal HYSCOMP_L indicating the result of the comparison. The first and second hysteresis voltages are the same voltage ΔV (0<ΔV<VREF). However, the first and second hysteresis voltages may be different from each other. The voltage ΔV is 10 mV (millivolts), for example.

The comparing circuit 40 can be constituted of comparators 41 and 42, and voltage sources 43 and 44, each of which generates a voltage amount ΔV. In the comparing circuit 40, the voltage obtained by adding the generation voltage of the voltage source 43 to the reference voltage VREF (namely, VREF+ΔV), and the voltage obtained by subtracting the generation voltage of the voltage source 44 from the reference voltage VREF (namely, VREF−ΔV) are applied to the inverting input terminal of the comparator 41 and the noninverting input terminal of the comparator 42. On the other hand, the feedback voltage VFB is applied to the noninverting input terminal of the comparator 41 and the inverting input terminal of the comparator 42. The output terminals of the comparators 41 and 42 output signals HYSCOMP_H and HYSCOMP_L, respectively.

The control circuit 50 generates and outputs gate control signals HG_CTRL and LG CTRL based on the signals HYSCOMP_H and HYSCOMP_L so as to control ON/OFF of the FETs 21 and 22. In an arbitrary FET, a conductive state between drain and source is referred to as an ON state, and a non-conductive state (shut-off state) between drain and source is referred to as an OFF state.

In the comparator 60, the noninverting input terminal is connected to the terminal TMO that is the node between the FETs 21 and 22, and the inverting input terminal is connected to the ground. Therefore, a signal ZEROCOMP depending on a polarity of the voltage VOUT is output from the output terminal of the comparator 60. The gate control signals HG_CTRL and LG_CTRL also depend on the output signal ZEROCOMP of the comparator 60.

The terminal TMO is connected to one end of the inductor L, and the other end of the inductor L is connected to one end of the voltage dividing resistor R1 and a positive electrode of the output capacitor Co. The other end of the voltage dividing resistor R1 is connected to the ground via the voltage dividing resistor R2, and a negative electrode of the output capacitor Co is directly connected to the ground. The voltage applied to the output capacitor Co is the output voltage Vo. The feedback voltage VFB corresponding to the output voltage Vo appears at the node between the resistors R1 and R2. Therefore, the node between the resistors R1 and R2 is connected to the terminal TMF. In addition, the phase compensation circuit PHC is connected in parallel to the inductor L, and the phase compensation circuit PHC is also connected to the node between the resistors R1 and R2.

Figure 2:
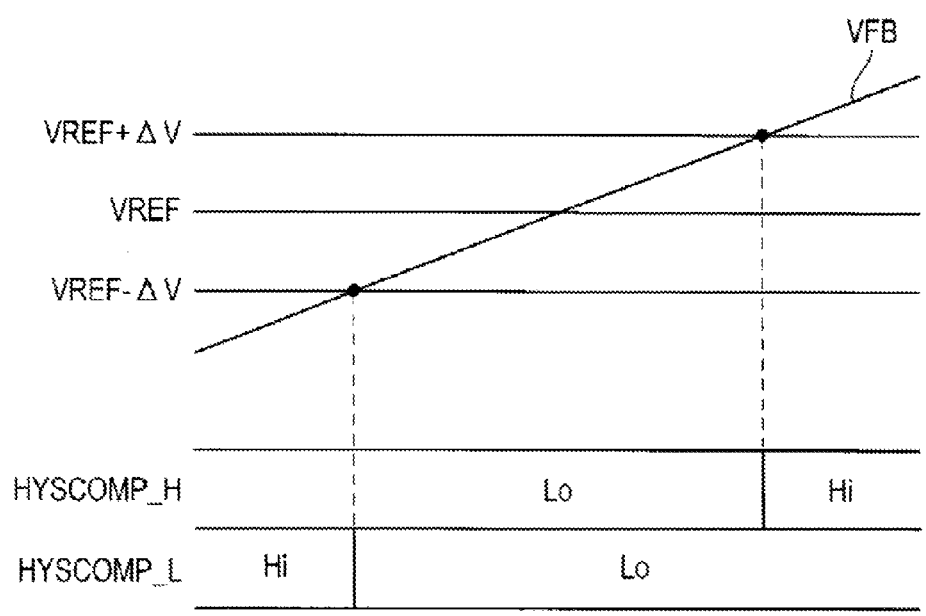
FIG. 2 is a graph showing a relationship among a reference voltage (VREF), a feedback voltage (VFB), and an output of a comparator.

FIG. 2 illustrates a relationship among the voltage VFB, the voltage VREF, the signal HYSCOMP_H, and the signal HYSCOMP_L. In this specification, a signal output from an arbitrary comparator, an arbitrary logic circuit, or a control circuit 50 is a voltage signal of a high level or a low level having a lower potential than the high level and a logic value different from that of the high level. Hereinafter, when the signal level of the voltage signal is the high level, it is referred to as High or Hi. On the contrary, when the signal level of the voltage signal is the low level, it is referred to as Low or Lo. For instance, "(HYSCOMP_H, HYSCOMP_L)=(Lo, Hi)" means that the signal HYSCOMP_H has the low level while the signal HYSCOMP_L has the high level.

As illustrated in FIG. 2, when "VFB<(VREF−ΔV)" is satisfied, (HYSCOMP_H, HYSCOMP_L)=(Lo, Hi) holds. When "(VREF−ΔV)<VFB<(VREF+ΔV)" is satisfied, (HYSCOMP_H, HYSCOMP_L)=(Lo, Lo) holds. When "(VREF+ΔV)<VFB" is satisfied, (HYSCOMP_H, HYSCOMP_L)=(Hi, Lo) holds.

Figure 3:
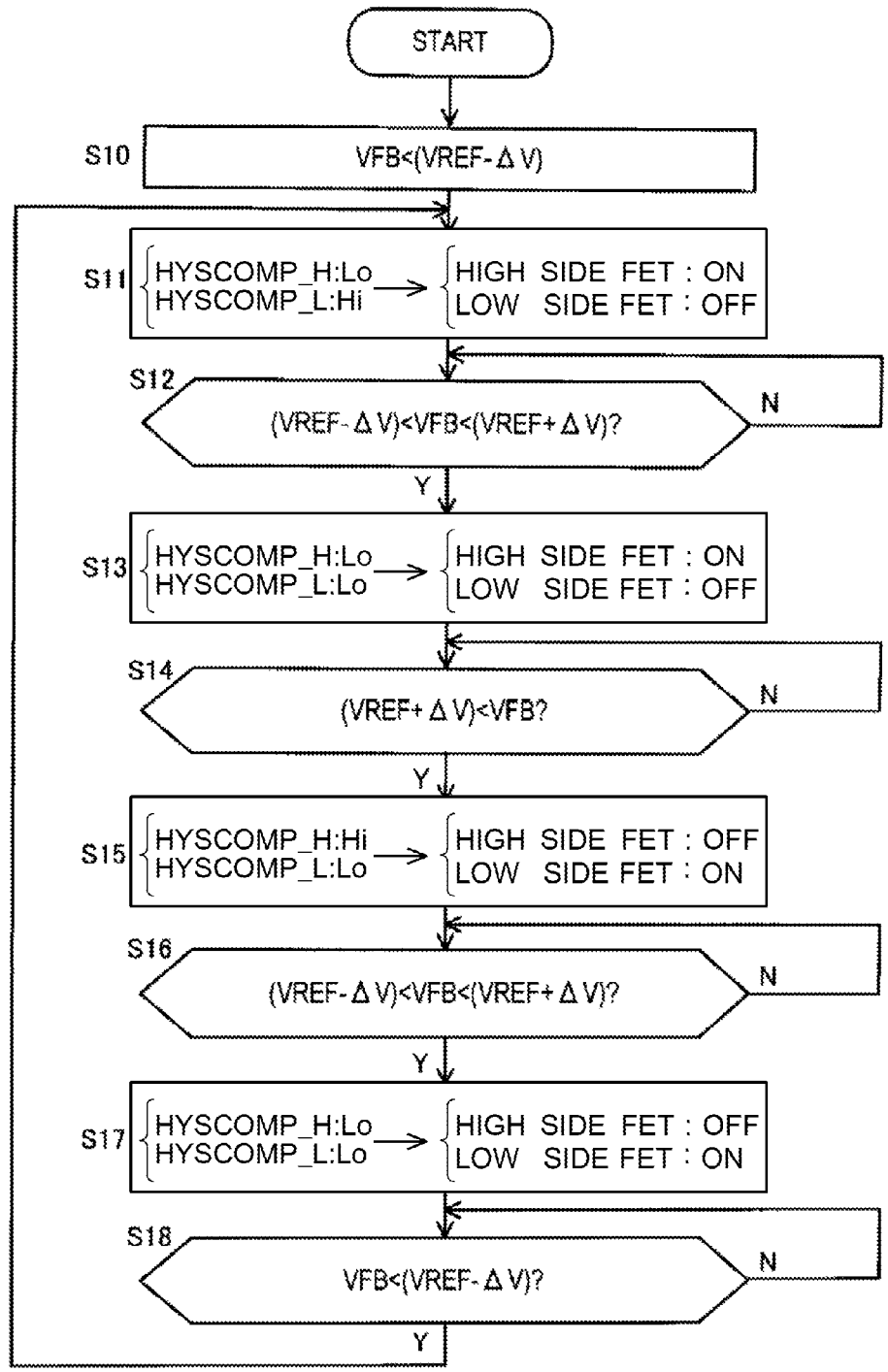
FIG. 3 is a flowchart illustrating a flow of ON/OFF control operation of an FET by a control circuit.

A flow of ON/OFF control operation of the FETs 21 and 22 by the control circuit 50 based on an output signal of the comparing circuit 40 is illustrated in FIG. 3. First, "VFB<(VREF−ΔV)" is satisfied (Step S10). Therefore, (HYSCOMP_H, HYSCOMP_L)=(Lo, Hi) is satisfied, and the control circuit 50 turns on the FET 21 (high side FET) and turns off the FET 22 (low side FET) in response to (HYSCOMP_H, HYSCOMP_L)=(Lo, Hi) (Step S11). The control circuit 50 can turn on the FETs 21 and 22 by respectively setting the gate control signals HG_CTRL and LG_CTRL to High, and can turn off the FETs 21 and 22 by respectively setting the gate control signal HG_CTRL and LG_CTRL to Low. When the FET 21 is turned on, the FET 22 is always turned off. When the FET 22 is turned on, the FET 21 is always turned off. The control circuit 50 can set a dead time for securely preventing the FETs 21 and 22 from being simultaneously turned on, but the dead time is neglected in the first embodiment for simple description.

When the FET 21 is turned on so that the voltage VFB is raised and "(VREF−ΔV)<VFB<(VREF+ΔV)" is satisfied (Y in Step S12), (HYSCOMP_H, HYSCOMP_L) is changed from (Lo, Hi) to (Lo, Lo). However, when this change occurs, the control circuit 50 does not change the states of the FETs 21 and 22 but maintains the ON state of the FET 21 (Step S13). Further, when the voltage VFB is increased so that "(VREF+ΔV)<VFB" is satisfied (Y in Step S14), (HYSCOMP_H, HYSCOMP_L)=(Hi, Lo) is satisfied, and the control circuit 50 turns off the FET 21 (high side FET) and turns on the FET 22 (low side FET) in response to (HYSCOMP_H, HYSCOMP_L)=(Hi, Lo) (Step S15).

When the FET 22 is turned on so that voltage VFB is dropped and "(VREF−ΔV)<VFB<(VREF+ΔV)" is satisfied (Y in Step S16), (HYSCOMP_H, HYSCOMP_L) is changed from (Hi, Lo) to (Lo, Lo). However, when this change occurs, the control circuit 50 does not change the states of the FETs 21 and 22 but maintains the ON state of the FET 22 (Step S17). When the voltage VFB is further dropped so that "VFB<(VREF−ΔV)" is satisfied (Y in Step S18), then (HYSCOMP_H, HYSCOMP_L)=(Lo, Hi) is satisfied.

After (HYSCOMP_H, HYSCOMP_L)=(Lo, Hi) is satisfied, the process returns to Step S11, and the operation described above is repeated. By this operation, the voltage VFB varies substantially within a voltage range from (VREF−ΔV) to (VREF+ΔV). The phase compensation circuit PHC includes a capacitor and acts to permit oscillation of the voltage VOUT due to alternate turning on of the FETs 21 and 22 to be mixed to voltage VFB without the resistor R1. As a result, the phase compensation circuit PHC, the inductor L, and the output capacitor Co work so that the output voltage Vo does not oscillate like the voltage VFB but is stabilized at a desired voltage value determined by the reference voltage VREF and the resistors R1 and R2.

Second Embodiment

A second embodiment of the present invention is described. When i is an arbitrary natural number, the (i+1)th embodiment is an embodiment based on the first to the i-th embodiments. Concerning a matter that is not described in the (i+1)th embodiment, the descriptions in the first to the i-th embodiments are also applied to the (i+1) embodiment unless otherwise noted and as long as no contradiction arises.

It is possible to dispose in the IC 10 a plurality of unit blocks, each of which includes the output circuit 20, the reference voltage generation circuit 30, the comparing circuit 40, the control circuit 50, and the comparator 60 (see FIG. 1). In this case, for each unit block, the terminals TMI, TMO, and TMF are disposed in the IC 10, and each unit block is equipped with an analog block including the inductor L, the voltage dividing resistors R1 and R2, the output capacitor Co, and the phase compensation circuit PHC. Thus, the output voltages Vo for the number of the unit blocks can be individually obtained. This form for individually obtaining output voltages Vo corresponding to the number of the unit blocks is referred to as a multisystem independent drive.

Figure 4:
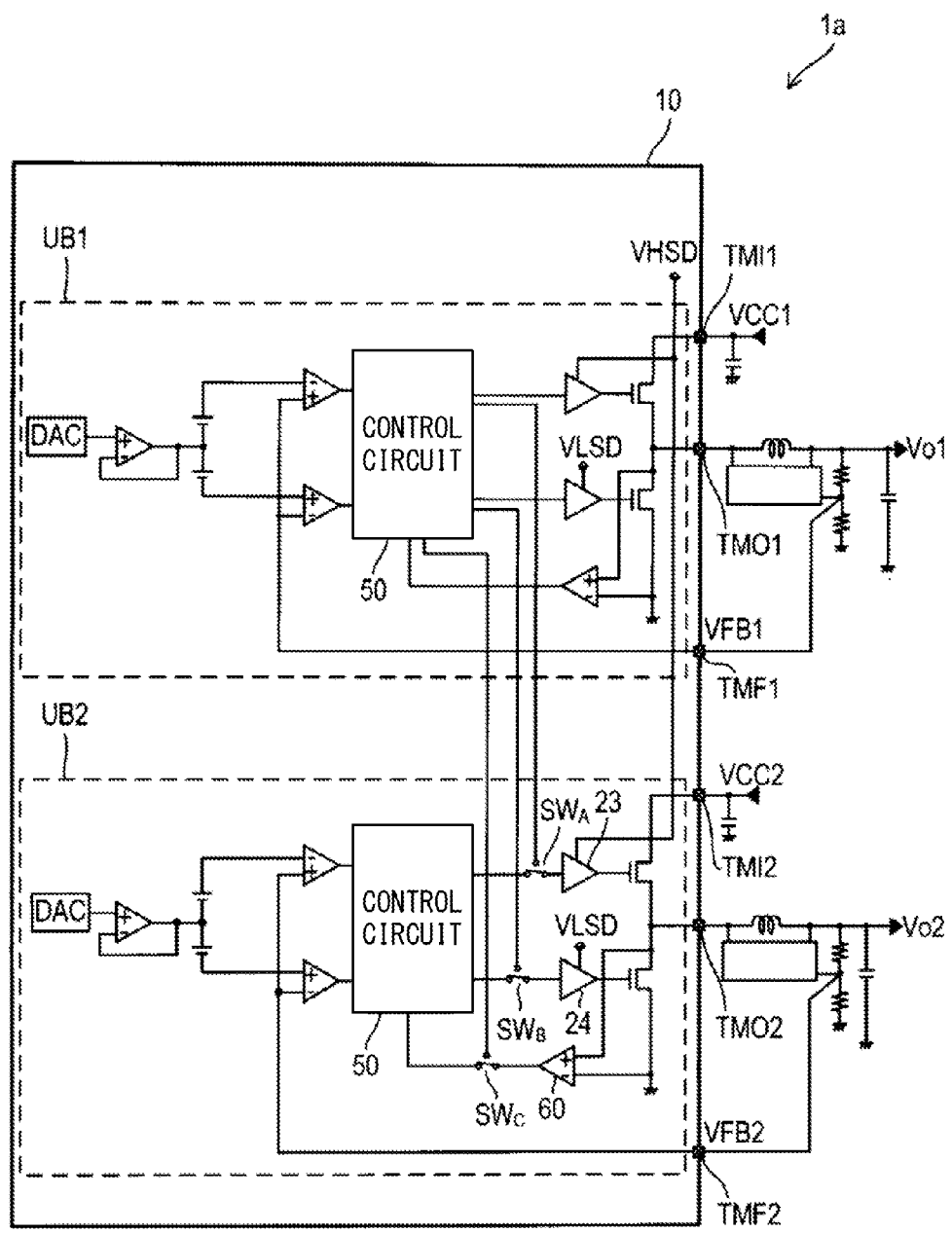
FIG. 4 is a schematic diagram of a power supply circuit according to a second embodiment of the present invention.

FIG. 4 illustrates a schematic diagram of a power supply circuit 1a adopting the multisystem independent drive. The IC 10 in the second embodiment includes two unit blocks UB1 and UB2. The input voltage VCC, the output voltage Vo, and the feedback voltage VFB (see FIG. 1) for the unit block UB1 are referred to as VCC1, Vo1, and VFB1, respectively. The input voltage VCC, the output voltage Vo, and the feedback voltage VFB for the unit block UB2 are referred to as VCC2, Vo2, and VFB2, respectively. The input voltages VCC1 and VCC2 may be the same voltage or may be different voltages. The same is true for the output voltages Vo1 and Vo2. The terminals TMI, TMO, and TMF disposed for the unit block UB1 are referred to as TMI1, TMO1, and TMF1, respectively. The terminals TMI, TMO, and TMF disposed for the unit block UB2 are referred to as TMI2, TMO2, and TMF2, respectively.

In the power supply circuit 1a, the output voltages Vo1 and Vo2 can be separately obtained. In other words, in the power supply circuit 1a, the unit circuit UB1 is used so that the output voltage Vo1 can be obtained from the input voltage VCC1 by the operation described above in the first embodiment, and the unit circuit UB2 is used so that the output voltage Vo2 can be obtained from the input voltage VCC2 by the operation described above in the first embodiment.

As illustrated in FIG. 4, the unit block UB2 includes switches SWA, SWB, and SWC. The switch SWA switches the gate control signal to be supplied to the gate driver 23 of the unit block UB2 between the gate control signal HG_CTRL output from the control circuit 50 of the unit block UB1 and the gate control signal HG_CTRL output from the control circuit 50 the unit block UB2 (see also FIG. 1). The switch SWB switches the gate control signal supplied to the gate driver 24 of the unit block UB2 between the gate control signal LG_CTRL output from the control circuit 50 of the unit block UB1 and the gate control signal LG_CTRL output from the control circuit 50 of the unit block UB2 (see also FIG. 1). The switch SWC switches an output destination of the signal ZEROCOMP from the comparator 60 of the unit block UB2 between the control circuit 50 of the unit block UB1 and the control circuit 50 of the unit block UB2. However, it is possible to omit the switch SWC and to supply the output signal ZEROCOMP of the comparator 60 of the unit block UB2 to both the control circuits 50 of the unit blocks UB1 and UB2.

In the power supply circuit 1a adopting the multisystem independent drive, states of the switches SWA to SWC are fixed when the power supply circuit 1a is formed or in other occasion, so that the control signals HG_CTRL and LG_CTRL are supplied from the control circuit 50 of the unit block UB2 to the drivers 23 and 24 of the unit block UB2, and that the output signal ZEROCOMP of the comparator 60 of the unit block UB2 is supplied to the control circuit 50 of the unit block UB2 (for example, the above-mentioned fixing is realized by supplying a low level signal to a specific terminal of the IC 10).

Third Embodiment

Figure 5:
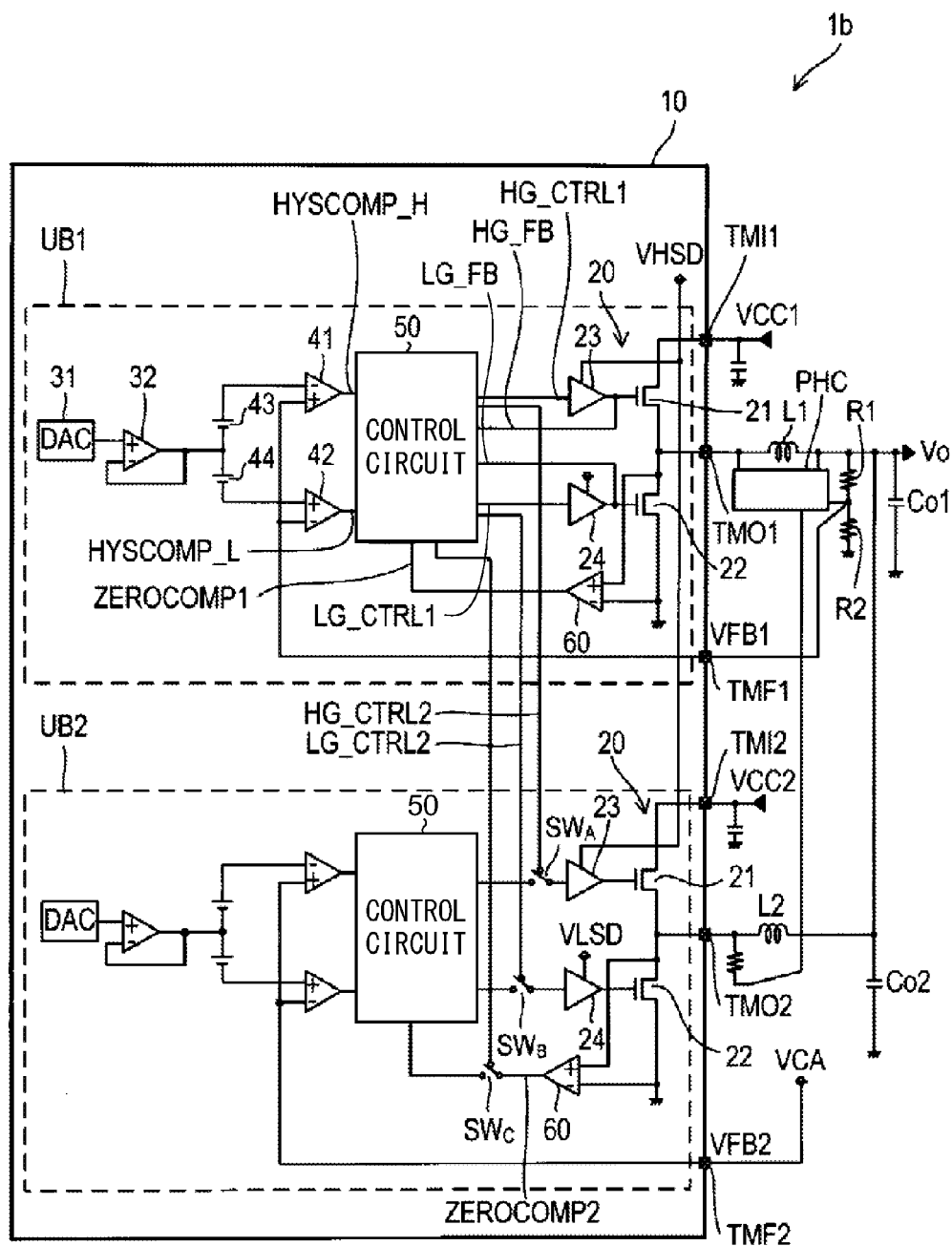
FIG. 5 is a schematic diagram of a power supply circuit according to a third embodiment of the present invention.

A third embodiment of the present invention is described. FIG. 5 illustrates a schematic diagram of a power supply circuit 1b according to the third embodiment. The power supply circuit 1b also uses the IC 10 described above in the second embodiment. However, the power supply circuit 1b can realize parallel driving in which a plurality of the output circuits 20 are used in parallel so as to obtain one output voltage Vo.

In the power supply circuit 1b, the inductor L and the output capacitor Co (see also FIG. 1) disposed for the unit block UB1 are denoted by L1 and Co1, respectively, while the inductor L and the output capacitor Co disposed for the unit block UB2 are denoted by L2 and Co2, respectively. In the unit block UB1, the terminal TMO1 connected commonly to the source of the FET 21 and the drain of the FET 22 is connected to the positive electrode of the capacitor Co1 via the inductor L1. In the unit block UB2, the terminal TMO2 connected commonly to the source of the FET 21 and the drain of the FET 22 is connected to the positive electrode of the capacitor Co2 via the inductor L2. The output capacitors Co1 and Co2 are connected in parallel, and the output voltage Vo is commonly applied to both the capacitors Co1 and Co2. In the power supply circuit 1b, the voltage dividing resistors R1 and R2 and the phase compensation circuit PHC are disposed only for the unit block UB1 but are not disposed for the unit block UB2. The terminal TMO2 is connected to the phase compensation circuit PHC via a resistor.

In the power supply circuit 1b, similarly to the first embodiment, a voltage at the node between the voltage dividing resistors R1 and R2 is supplied to the terminal TMF1 (terminal TMF for the unit block UB1) as the feedback voltage VFB1 (feedback voltage VFB for the unit block UB1), but the voltage at the terminal TMF2 is fixed to a voltage VCA higher than the voltage (VREF+ΔV). Further, in the power supply circuit 1b, states of the switches SWA to SWC are fixed to the states when the power supply circuit 1b is formed or in other occasion, so that the gate control signal is supplied from the control circuit 50 of the unit block UB1 to the drivers 23 and 24 of the unit block UB2, and that the output signal of the comparator 60 of the unit block UB2 is supplied to the control circuit 50 of the unit block UB1 (for example, this fixing is realized by supplying a high level signal to a specific terminal of the IC 10). As a result, the control circuit 50 of the unit block UB2 and the circuit before the same do not work significantly. Therefore, in this embodiment, the control circuit 50 described below is supposed to indicate the control circuit 50 of the unit block UB1. In addition, concerning the power supply circuit 1b, "VFB=VFB1" is satisfied.

The gate control signals HG_CTRL output from the control circuit 50 to the drivers 23 of the unit blocks UB1 and UB2 are denoted by HG_CTRL1 and HG_CTRL2, respectively, and the gate control signals LG_CTRL output from the control circuit 50 to the drivers 24 of the unit blocks UB1 and UB2 are denoted by LG_CTRL1 and LG_CTRL2, respectively. In addition, the output signals ZEROCOMP of the comparators 60 of the unit blocks UB1 and UB2 are denoted by ZEROCOMP1 and ZEROCOMP2, respectively. In addition, in the unit block UB1, output signals of the drivers 23 and 24 (namely, gate signals of the FETs 21 and 22) are supplied to the control circuit 50 as signals HG_FB and LG_FB, respectively.

Figure 6:
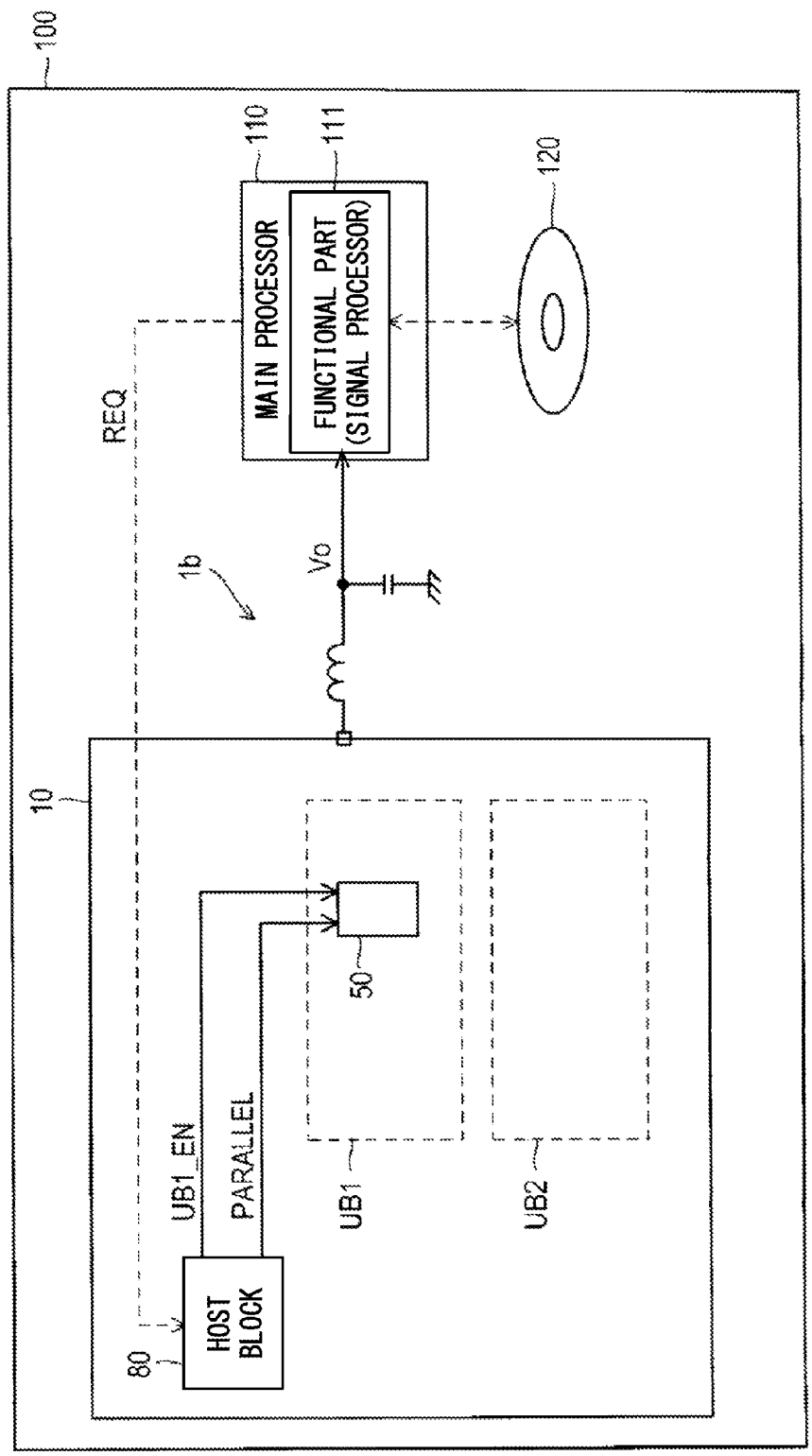
FIG. 6 is a schematic diagram of an electronic appliance according to the third embodiment of the present invention.

FIG. 6 illustrates a schematic diagram of an electronic appliance 100 including the power supply circuit 1b. In FIG. 6, for simple illustration, an analog circuit part forming the output voltage Vo is simplified. The electronic appliance 100 is an arbitrary information apparatus capable of acquiring, reproducing, or processing arbitrary information, such as a magnetic disk device (magnetic disk storage device), a personal computer, a cellular phone, an information terminal, an electronic book reader, an electronic dictionary, a digital camera, a game apparatus, or a navigation apparatus. The electronic appliance 100 includes the power supply circuit 1b including the IC 10, and a main processor 110 constituted of an integrated circuit or the like. The main processor 110 includes a functional part 111 operating by using the output voltage Vo of the power supply circuit 1b as a drive voltage.

Figure 7:
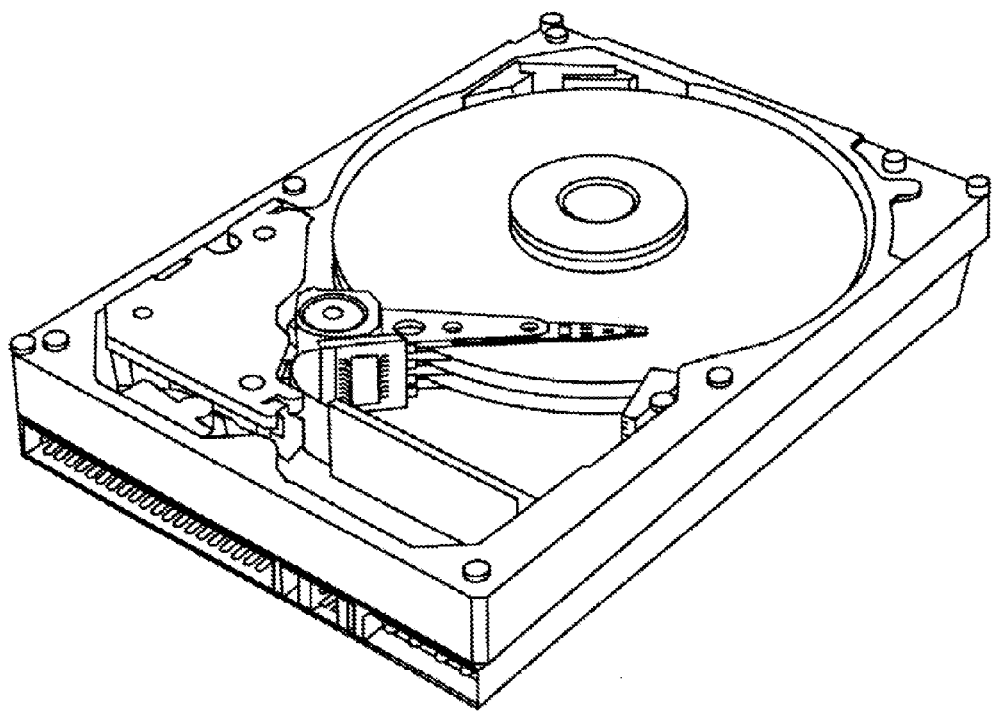
FIG. 7 is an external view of a magnetic disk device as an electronic appliance according to the third embodiment of the present invention.
Figure 8:
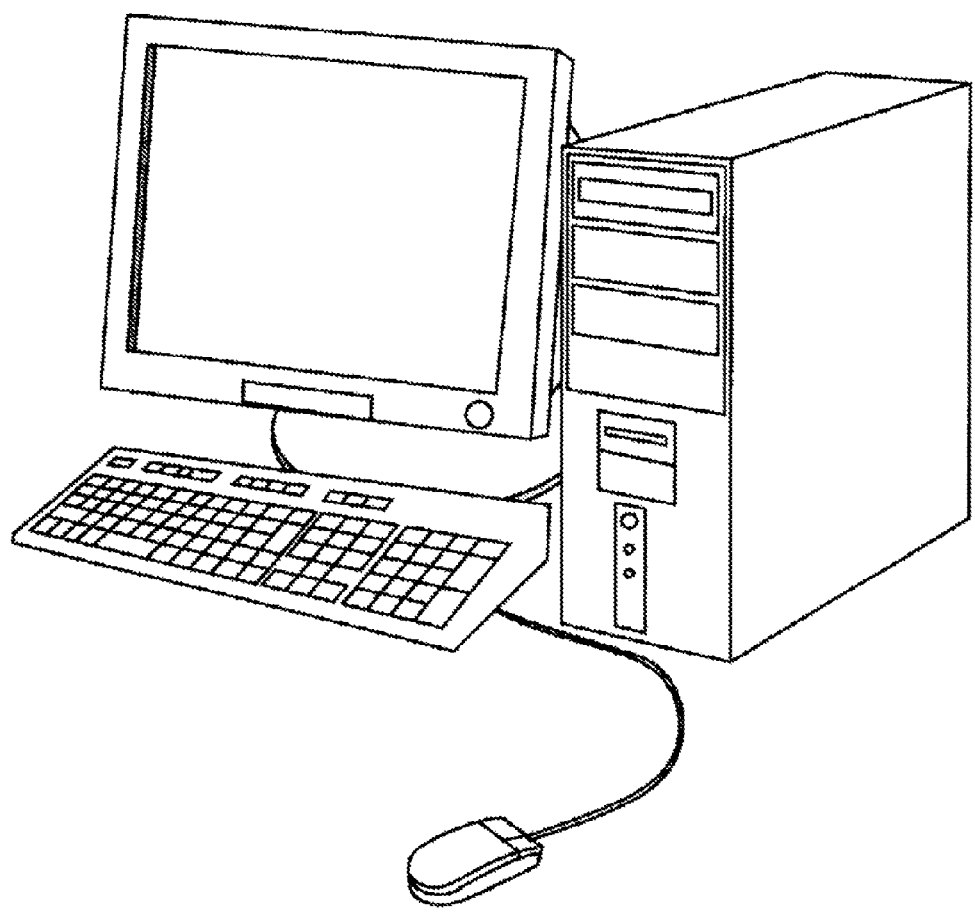
FIG. 8 is an external view of a personal computer as the electronic appliance according to the third embodiment of the present invention.

The functional part 111 realizes an arbitrary function, but it is supposed here that the electronic appliance 100 is an magnetic disk device (magnetic disk storage device) capable of reading and writing data to a magnetic disk 120. In this case, for example, the functional part 111 works as a signal processor and performs signal processing on data read from the magnetic disk 120 and signal processing on data to be written on the magnetic disk 120 using the output voltage Vo of the power supply circuit 1b as the drive voltage. FIG. 7 illustrates an external perspective view of the magnetic disk device formed as the electronic appliance 100. The electronic appliance 100 may be a personal computer including the magnetic disk device as illustrated in FIG. 8.

The signal processing on data of the magnetic disk 120 is not always performed, and power necessary for the signal processing varies in accordance with content of the signal processing. The main processor 110 outputs a request signal REQ corresponding to power necessary for the functional part 111 to the IC 10. The IC 10 includes a host block 80 for the control circuit 50, and the host block 80 supplies signals UB1_EN and PARALLEL to the control circuit 50 in response to the request signal REQ.

The control circuit 50 can operate in a first mode or in a second mode. In the first mode, between the output circuit 20 of the unit block UB1 (hereinafter referred to also as a first output circuit 20) and the output circuit 20 of the unit block UB2 (hereinafter referred to also as a second output circuit 20), only the first output circuit 20 is used for generating the output voltage Vo. In the second mode, both the first and second output circuits 20 are used for generating the output voltage Vo. The mode in which the control circuit 50 is actually operating is referred to also as a real operation mode. As illustrated in FIG. 9, when the signal UB1_EN is High (Hi) and the signal PARALLEL is Low (Lo), the real operation mode becomes the first mode. When the signals UB1_EN and PARALLEL are both High, the real operation mode becomes the second mode. Therefore, the host block 80 can be said to include a mode instruction circuit for instructing the real operation mode. When the signal UB1_EN is Low, regardless of a logic level of the signal PARALLEL, the FETs 21 and 22 of the unit block UB1 and the FETs 21 and 22 of the unit block UB2 are all maintained to be off so that the operation of the power supply circuit 1b is stopped.

In the first mode, the control signals HG_CTRL2 and LG_CTRL2 are fixed to Low, and the output voltage Vo is generated by alternately turning on the FETs 21 and 22 of the unit block UB1 similarly to the first embodiment.

In the second mode, the control circuit 50 performs ON/OFF control of the four FETs (21 and 22) so that the FETs 21 of the unit blocks UB1 and UB2 are turned on or off synchronously and the FETs 22 of the unit blocks UB1 and UB2 are turned on or off synchronously. The ON/OFF control in the second mode is referred to as synchronous ON/OFF control. In the second mode too, similarly to the first embodiment, the set of the two FETs 21 and the set of the two FETs 22 are alternately turned on so that the output voltage Vo is generated. By this alternate turning on, the voltage VFB1 varies substantially within the voltage range from (VREF− $\Delta$V) to (VREF+$\Delta$V). The phase compensation circuit PHC includes a capacitor and acts to permit voltage oscillations at the terminals TMO1 and TMO2 due to alternate turning on of the FETs 21 and 22 to be mixed the voltage VFB1 without the resistor R1. As a result, the phase compensation circuit PHC, the inductors L1 and L2, and the output capacitors Co1 and Co2 work so that the output voltage Vo does not oscillate like the voltage VFB1 but is stabilized at a desired voltage value determined by the reference voltage VREF and the resistors R1 and R2.

Figure 10A:
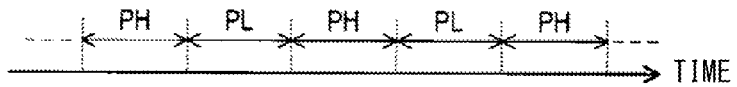
FIG. 10 is a timing chart of (a) alternate ON period of a high side FET and ON period of a low side FET, and (b) and (c) gate control signals in mode switching, according to the third embodiment of the present invention.
Figure 10B:
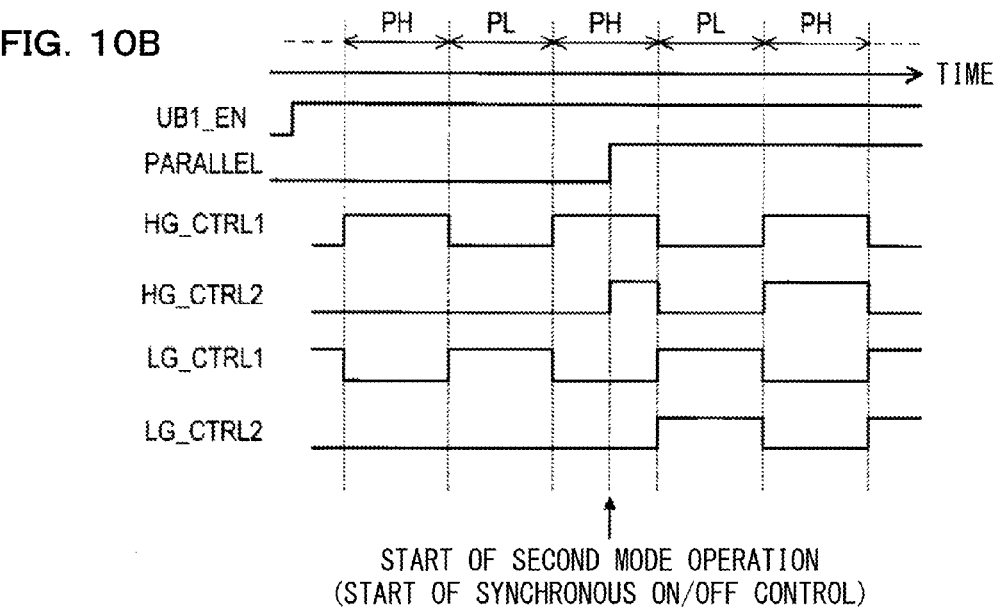
Figure 10C:
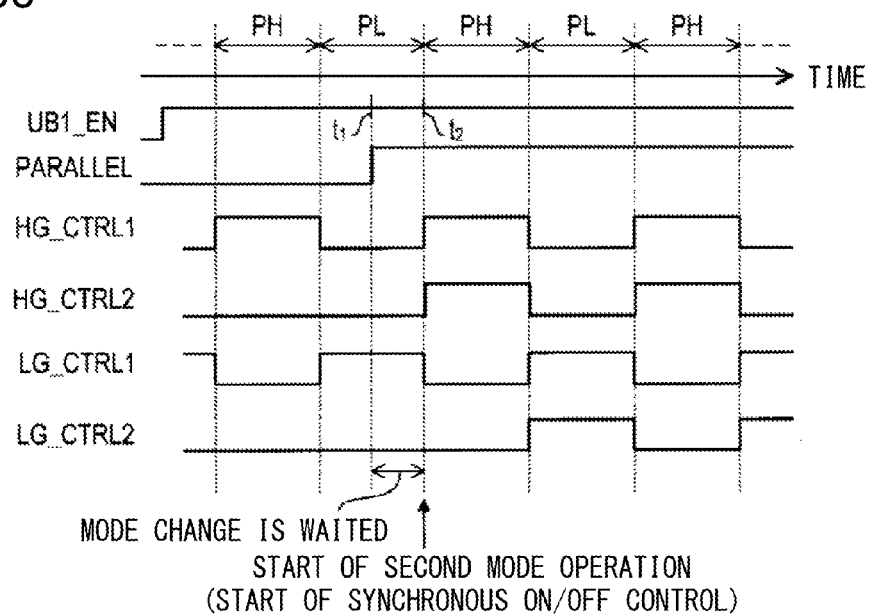

Here, as illustrated in (a) of FIG. 10, both in the first mode and in the second mode, a period PH in which the FET 21 is turned on and a period PL in which the FET 22 is turned on appear alternately. It is supposed that the signal PARALLEL is switched from Low to High in the state where the signal UB1_EN is High. The switching of the signal PARALLEL from Low to High in the state where the signal UB1_EN is High corresponds to a mode switching signal for instructing to switch from the first mode to the second mode of the real operation mode. The main processor 110 outputs the request signal REQ independently of the IC 10, and the host block 80 switches the signal PARALLEL from Low to High in response to the request signal REQ. Therefore, the switch timing of the signal PARALLEL from Low to High (namely, input timing of the mode switching signal to the control circuit 50) may be in the period PH or may be in the period PL.

As illustrated in (b) of FIG. 10, when the switch timing of the signal PARALLEL from Low to High is in the period PH, the control circuit 50 promptly switches the real operation mode from the first mode to the second mode so as to start the operation in the second mode from the switch timing (namely, to promptly start the synchronous ON/OFF control from the switch timing).

In contrast, as illustrated in (c) of FIG. 10, when the switch timing of the signal PARALLEL from Low to High is in the period PL, the control circuit 50 waits to execute the synchronous ON/OFF control until the signal HG_CTRL1 of High level is output after that. In other words, when receiving the input of the mode switching signal during the period PL, the control circuit 50 waits to execute the synchronous ON/OFF control after input timing t1 of the mode switching signal until timing t2 at which the signal HG_CTRL1 is first switched from Low to High, so as to start the synchronous ON/OFF control (namely, operation in the second mode) from the timing t2.

If the switching to the second mode is executed during the period PL, there is an anxiety that the number of low side FETs through which current flows to the ground is doubled during the period PL (is increased from one to two) so that the output voltage Vo is transiently dropped excessively. The excess drop of the output voltage Vo may disturb the stable operation of the functional part 111 and may stop the operation of the functional part 111. On the other hand, when the switching to the second mode is executed during the period PH, there is no such anxiety.

Considering this, as described above, when switching the real operation mode from the first mode to the second mode, the control circuit 50 inhibits the start of the operation in the second mode in the state where the FETs 22 in the output circuits 20 of the unit blocks UB1 and UB2 are turned on. Thus, the transient excess drop of the output voltage Vo in switching to the parallel driving can be avoided, and hence the stable operation of the functional part 111 can be secured.

In addition, by forming the IC 10 as described above in the second and third embodiments, both the power supply circuit 1a illustrated in FIG. 4 and the power supply circuit 1b illustrated in FIG. 5 can be constituted of the common IC 10. In other words, it is not necessary to prepare different ICs for the individual power supply circuits, and versatility of the IC can be enhanced.

Figure 11:
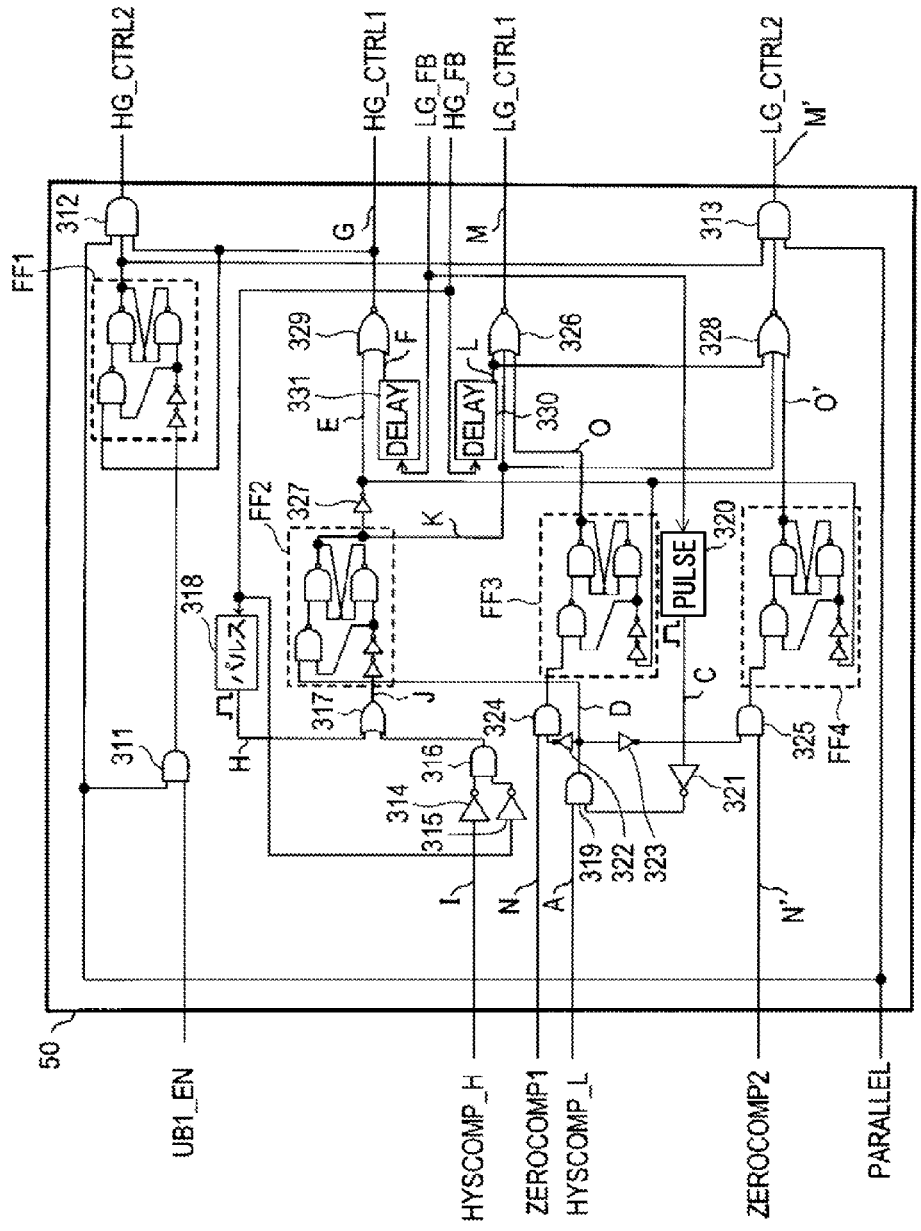
FIG. 11 is an internal circuit diagram of the control circuit according to the third embodiment of the present invention.

FIG. 11 illustrates an internal circuit diagram of the control circuit 50 for realizing the operations in the first and second modes described above and the switching from the first mode to the second mode.

Figures 12A, 12B:
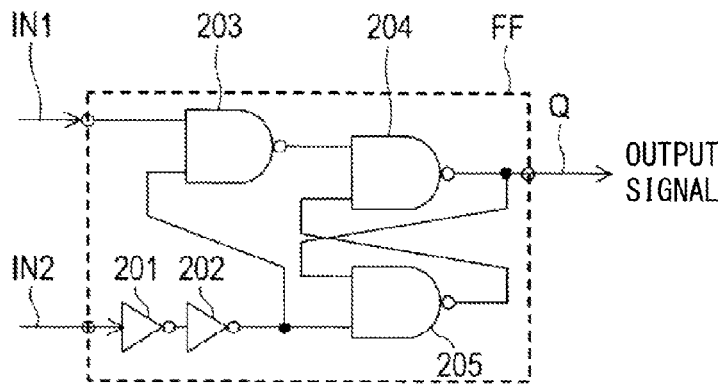
FIG. 12 illustrates (a) a circuit diagram of a flip-flop included in the control circuit of FIG. 11, and (b) state transition diagram of the flip-flop.

Each of circuits FF1 to FF4 illustrated in FIG. 11 is a flip-flop having the same circuit structure as that of the flip-flop FF illustrated in (a) of FIG. 12. The flip-flop FF includes NOT circuits (inverter circuits) 201 and 202 and two-input NAND (not AND) circuits 203 to 205, so as to output a signal Q in response to two input signals IN1 and IN2. The input signal IN1 is supplied to a first input terminal of the NAND circuit 203, and the input signal IN2 is commonly supplied to a second input terminal of the NAND circuit 203 and a second input terminal of the NAND circuit 205 via the NOT circuits 201 and 202. An output signal of the NAND circuit 203 is supplied to a first input terminal of the NAND circuit 204, and an output signal of the NAND circuit 205 is supplied to a second input terminal of the NAND circuit 204. An output signal of the NAND circuit 204 is an output signal Q of the flip-flop FF and is supplied to a first input terminal of the NAND circuit 205.

Section (b) of FIG. 12 illustrates a relationship among the signals IN1, IN2, and Q of the flip-flop FF. First, a first state in which the signals IN1 and IN2 are both Low is considered to be a start point. In the first state, the signal Q is Low. In the first state as the start point, even if one of the signals IN1 and IN2 becomes High, the signal Q remains to be Low. However, when the signals IN1 and IN2 become both High, the signal Q becomes High. When a second state in which the signals IN1, IN2, and Q are all High is the start point, even if the signal IN1 is switched to Low, the signal Q is maintained to be High. However, when the signal IN2 is switch to Low without depending on level of the signal IN1, the signal Q is switched to Low. An initial state of the flip-flops FF1 to FF4 when the power supply circuit 1b and the control circuit 50 start is the first state.

With reference to FIG. 11, an internal circuit of the control circuit 50 is described specifically. The control circuit 50 includes circuits 311 to 331 in addition to the flip-flops FF1 to FF4.

The signal UB1_EN is supplied to a second input terminal of the two-input AND (logical product) circuit 311. The signal PARALLEL is supplied to a first input terminal of the AND circuit 311, a first input terminal of the three-input AND circuit 312, and a third input terminal of the three-input AND circuit 313. The signal HYSCOMP_H is supplied to a first input terminal of the two-input AND circuit 316 via the NOT circuit 314, and the signal HG_FB is supplied to a second input terminal of the AND circuit 316 via the NOT circuit 315. An output signal of the AND circuit 316 is supplied to a second input terminal of the two-input OR (logical sum) circuit 317. An output signal of the pulse generation circuit 318 is supplied to a first input terminal of the OR circuit 317. The pulse generation circuit 318 generates a pulse responding to a leading edge of the signal HG_FB. In other words, the output signal of the pulse generation circuit 318 is usually Low and becomes High only for a predetermined period from time point of switching of the signal HG_FB from Low to High.

The signal HYSCOMP_L is supplied to the first input terminal of the two-input AND circuit 319, and an second input terminal of the AND circuit 319 is supplied with the output signal of the pulse generation circuit 320 via the NOT circuit 321. The pulse generation circuit 320 generates a pulse responding to a leading edge of the signal LG_FB. In other words, the output signal of the pulse generation circuit 320 is usually Low and becomes High only for a predetermined period from time point of switching of the signal LG_FB from Low to High. An output signal of the AND circuit 319 is supplied to a second input terminal of the two-input AND circuit 324 via the NOT circuit 322 and is supplied to a first input terminal of the two-input AND circuit 325 via the NOT circuit 323. A first input terminal of the AND circuit 324 and a second input terminal of the AND circuit 325 are supplied with the signals ZEROCOMP1 and ZEROCOMP2, respectively.

The input signals IN1 and IN2 of the flip-flop FF1 (see also (a) of FIG. 12) are the signal HG_CTRL1 and an output signal of the AND circuit 311, respectively. The input signals IN1 and IN2 of the flip-flop FF2 are the output signal of the AND circuit 319 and an output signal of the OR circuit 317, respectively. An output signal Q of the flip-flop FF1 is supplied to a second input terminal of the AND circuit 312 and a first input terminal of the AND circuit 313. An output signal Q of the flip-flop FF2 is supplied to a second input terminal of the three-input NOR (not OR) circuit 326 and a second input terminal of the three-input NOR circuit 328 and is supplied to a first input terminal of the two-input NOR circuit 329 via the NOT circuit 327. The input signal IN1 of the flip-flops FF3 and FF4 are respectively an output signal of the AND circuit 324 and an output signal of the AND circuit 325. Input signals IN2 of the flip-flops FF3 and FF4 are both an output signal of the NOT circuit 327 (namely, an inverted signal of an output signal of the flip-flop FF2). An output signal Q of the flip-flop FF3 is supplied to a third input terminal of the NOR circuit 326, and an output signal Q of the flip-flop FF4 is supplied to a third input terminal of the NOR circuit 328. An output signal of the NOR circuit 328 is supplied to a second input terminal of the AND circuit 313.

The delay circuit 330 delays the signal HG_FB by a predetermined time and supplies the delayed signal to a first input terminal of the NOR circuit 326 and a first input terminal of the NOR circuit 328. The delay circuit 331 delays the signal LG_FB for a predetermined time and supplies the delayed signal to a second input terminal of the NOR circuit 329. An output signal of the NOR circuit 329 is supplied to a third input terminal of the AND circuit 312. The output signals of the NOR circuit 329, the NOR circuit 326, the AND circuit 312, and the AND circuit 313 are the signals HG_CTRL1, LG_CTRL1, HG_CTRL2, and LG_CTRL2, respectively.

As illustrated in FIG. 11, a signal A is the signal HYSCOMP_L, a signal C is the output signal of the pulse generation circuit 320, a signal D is the output signal of the AND circuit 319, a signal E is the output signal of the NOT circuit 327, a signal F is an output signal of the delay circuit 331, a signal G is the signal HG_CTRL1, a signal H is the output signal of the pulse generation circuit 318, a signal I is the signal HYSCOMP_H, a signal J is the output signal of the OR circuit 317, a signal K is the output signal (Q) of the flip-flop FF2, a signal L is an output signal of the delay circuit 330, a signal M is the signal LG_CTRL1, a signal N is the signal ZEROCOMP1, a signal O is an output signal (Q) of the flip-flop FF3, a signal M' is the signal LG_CTRL2, a signal N' is the signal ZEROCOMP2, and a signal O' is an output signal (Q) of the flip-flop FF4.

Figure 13:
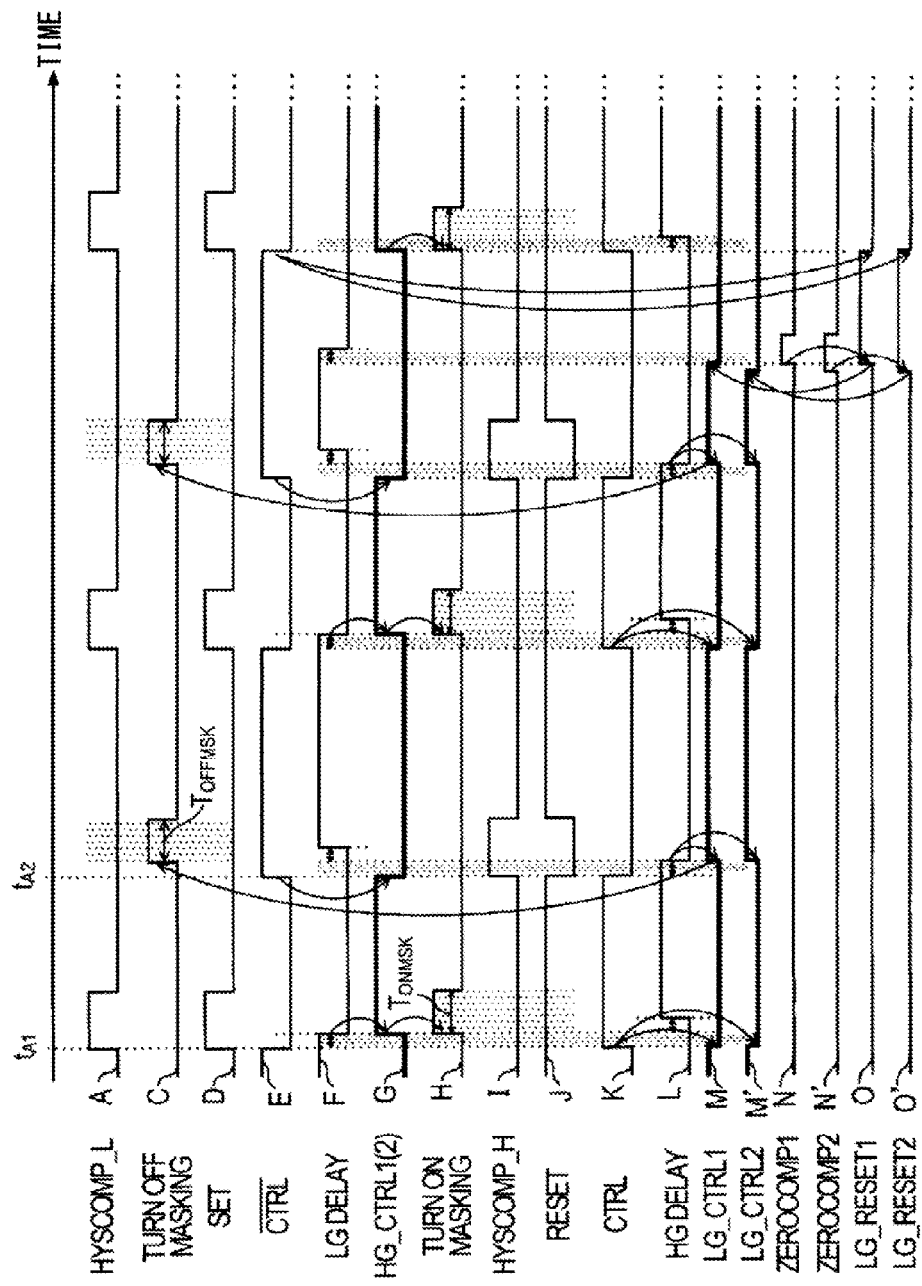
FIG. 13 is a timing chart of signals in the control circuit of FIG. 11.

FIG. 13 illustrates a timing chart of the signals A, C to O, M', N', and O' in the second mode. FIG. 13 is a timing chart after completing the start of the second mode (in the stable operation in the second mode), and hence the signal HG_CTRL2 is the same as the signal HG_CTRL1 in FIG. 13. The signal D corresponds to a signal "SET" for turning on the FET 21. The signals E and K correspond to the gate control signal responding to the signal "SET".

Switching the FET 21 as the high side FET to an ON state can be called "turning on", while switching the FET 22 as the low side FET to an OFF state can be called "turning off". The signal H corresponds to a signal "TURN ON MASKING"

acting to maintain the ON state of the FET 21 for at least a predetermined masking time TONMSK after the FET 21 is switched to the ON state. Therefore, a pulse generated by the circuit 318 has a width "TONMSK". The signal C corresponds to a signal "TURN OFF MASKING" acting to maintain the ON state of the FET 22 for at least a predetermined masking time TOFFMSK after the FET 22 is switched to the ON state. Therefore, a pulse generated by the circuit 320 has a width "TOFFMSK". The circuits 318 and 320 are disposed so that the FET 21 or 22 to be maintained to be the ON state does not become the OFF state as an error due to an influence of noise or the like.

The signal L corresponds to a delay signal "HG DELAY" for the gate signal to the high side FET 21, and the signal F corresponds to a delay signal "LG DELAY" for the gate signal to the low side FET 22. The signals L and F generated by the delay circuits 330 and 331 are supplied to the NOR circuits (326, 329 and the like) generating the gate control signals (LG_CTRL1, HG_CTRL1, and the like), and hence simultaneous ON state of the FET 21 and FET 22 can be securely avoided. In other words, a so-called dead time is inserted by the delay circuits 330 and 331.

A timing tA1 illustrated in FIG. 13 corresponds to a timing at which the decreasing feedback voltage VFB becomes just lower than the voltage (VREF−ΔV) (see FIG. 2), and the signal A as the signal HYSCOMP_L rises (namely, switches from Low to High) at this timing tA1. In response to the rising (switching from Low to High) of the signal A, the signal D as well as the signal K rises. Then, in response to the rising of the signal K, the signals M and M' (namely, the gate control signals LG_CTRL1 and LG_CTRL2) are switched to Low. The gate control signal LG_CTRL1 is fed back as the signal LG_FB, and the signal G rises in response to the switching of the delay signal F to Low based on the signal LG_FB. As a result, the FET 21 is turned on.

After that, when the feedback voltage VFB becomes higher than the voltage (VREF+ΔV) at a timing tA2, the signal I as the signal HYSCOMP_H rises. In response to the rising of the signal I, the signal J corresponding to a signal "RESET" of the flip-flop FF2 becomes Low. Therefore, the signal E switches to High, and the signal G switches to Low. As a result, the gate control signals HG_CTRL1 and HG_CTRL2 for turning off the FETs 21 are generated. The gate control signal HG_CTRL1 is fed back as the signal HG_FB, and the signals M and M' rise in response to the switching of the delay signal L to Low based on the signal HG_FB. As a result, the FET 22 becomes ON state.

Further, when the signal N (ZEROCOMP1) rises, the signal O as a signal LG_RESET1 also rises so that the signal M (LG_CTRL1) is forced to be off. Similarly, when the signal N' (ZEROCOMP2) rises, the signal O' as a signal LG_RESET2 also rises so that the signal M' (LG_CTRL2) is forced to be off. The signals O and O' are reset to Low in response to the switching of the signal E to Low.

The operation described above with reference to (b) and (c) of FIG. 10 is achieved mainly by the flip-flop FF1 and the AND circuit 313. When the signal PARALLEL is switched from Low to High in the state where the signal UB1_EN is High, the output signal of the flip-flop FF1 does not become High unless the signal HG_CTRL1 once becomes High. If the output signal of the flip-flop FF1 does not become High, the signal LG_CTRL2 remains to be Low. In this way, start of the synchronous ON/OFF control is inhibited in the state where the FETs 22 of the unit blocks UB1 and UB2 are turned on.

Fourth Embodiment

A fourth embodiment of the present invention is described. In the fourth embodiment, there is described a structure of the comparing circuit with hysteresis 40 that can be applied to the first, second, or third embodiment.

Figure 14:
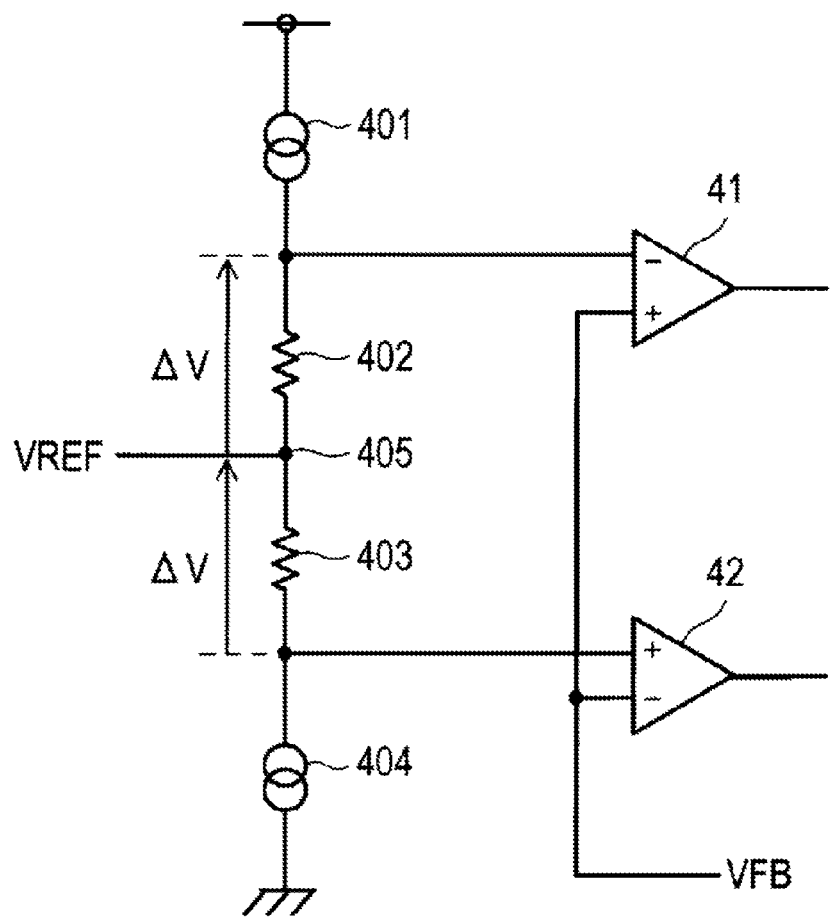
FIG. 14 illustrates an example of a comparing circuit according to a fourth embodiment of the present invention.

It is possible to form the comparing circuit 40 using a circuit structure as illustrated in FIG. 14. In the circuit of FIG. 14, a DC voltage is applied to a serial circuit of a constant current source 401, a resistor 402, a resistor 403, and a constant current source 404, and the reference voltage VREF is applied to a node 405 between the resistors 402 and 403, so that the resistors 402 and 403 generate the voltage ΔV. In the structure of FIG. 14, a current mirror circuit using a P-channel FET forms the constant current source 401, and a current mirror circuit using a N-channel FET forms the constant current source 404.

In order that the center of oscillation of the feedback voltage VFB accurately coincides with the reference voltage VREF (namely, in order that the output voltage Vo accurately coincides with a desired voltage), it is important that characteristics of the FET forming the constant current source 401 and characteristics of the FET forming the constant current source 404 are identical as much as possible. However, because types of the FETs (channel types) used for the constant current sources 401 and 404 are different from each other, it is difficult to enhance the above-mentioned conformity of characteristics.

Figure 15:
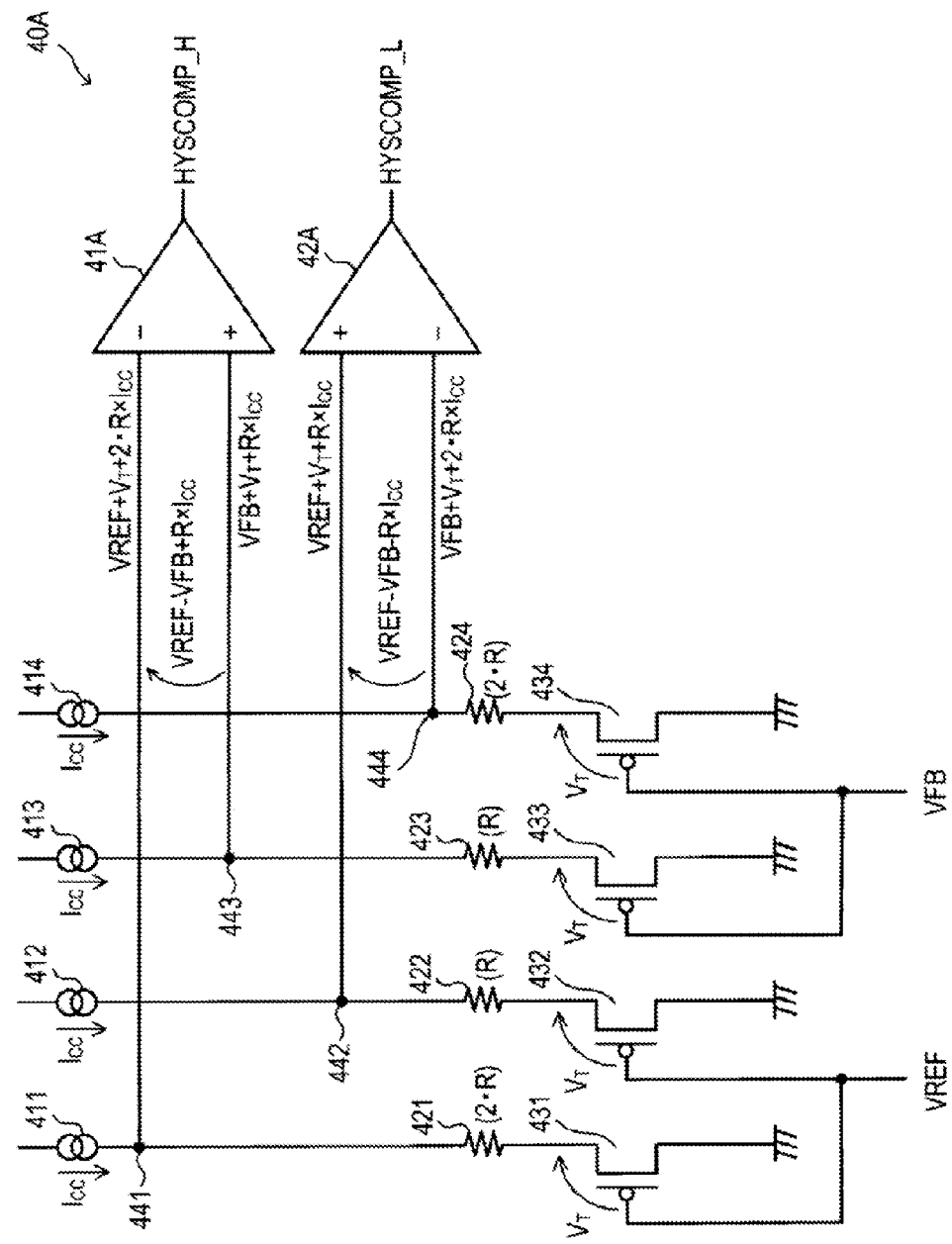
FIG. 15 is a circuit diagram of the comparing circuit according to the fourth embodiment of the present invention.

Considering this, a comparing circuit 40A illustrated in FIG. 15 should be used as the comparing circuit 40 of the first, second, or third embodiment. The comparing circuit 40A includes comparators 41A and 42A, constant current sources 411 to 414, resistors 421 to 424, and FETs 431 to 434. The FETs 431 to 434 are P-channel MOSFETs. The FETs 431 to 434 are formed so as to have the same characteristics.

The gates (control terminals) of the FETs 431 and 432 are applied with the reference voltage VREF, while the gates (control terminals) of the FETs 433 and 434 are applied with the feedback voltage VFB. The drains of the FETs 431 to 434 are connected to the ground. The sources of the FETs 431, 432, 433, and 434 are connected to the constant current sources 411, 412, 413, and 414 via the resistors 421, 422, 423, and 424, respectively. A node 441 between the constant current source 411 and the resistor 421 is connected to the inverting input terminal of the comparator 41A, and a node 443 between the constant current source 413 and the resistor 423 is connected to the noninverting input terminal of the comparator 41A. A node 442 between the constant current source 412 and the resistor 422 is connected to the noninverting input terminal of the comparator 42A, and a node 444 between the constant current source 414 and the resistor 424 is connected to the inverting input terminal of the comparator 42A.

The constant current source 411 supplies constant current ICC flowing in the direction from the node 441 to the ground via the resistor 421 and the FET 431. The constant current source 412 supplies constant current ICC flowing in the direction from the node 442 to the ground via the resistor 422 and the FET 432. The constant current source 413 supplies constant current ICC flowing in the direction from the node 443 to the ground via the resistor 423 and the FET 433. The constant current source 414 supplies constant current ICC flowing in the direction from the node 444 to the ground via the resistor 424 and the FET 434. The constant current supplied from the constant current sources 411 to 414 have the same value. VT denotes a gate-source voltage (namely, a source potential with respect to a gate potential) of each of the FETs 431 to 434.

Further, resistance values of the resistors 422 and 423 are set to "R", and resistance values of the resistors 421 and 424 are set to twice the resistance value of the resistor 422, namely to "2×R". Then, potentials of the inverting input terminal and the noninverting input terminal of the comparator 41A become (VREF+VT+2·R×ICC) and (VFB+VT+R×ICC), respectively. Potentials of the noninverting input terminal and the inverting input terminal of the comparator 42A become (VREF+VT+R×ICC) and (VFB+VT+2·R×ICC), respectively. Therefore, in the comparator 41A, a potential difference between the noninverting input terminal and the inverting input terminal viewed from the noninverting input terminal is (VREF-VFB+R×ICC). In the comparator 42A, a potential difference between the noninverting input terminal and the inverting input terminal viewed from the inverting input terminal is (VREF-VFB-R×ICC). Therefore, by setting the resistance value R and the current value ICC so that "(R×ICC)=ΔV" is satisfied, an equivalent circuit of the comparing circuit 40A is the same as the comparing circuit 40 illustrated in FIG. 1 and other diagram (see also FIG. 2). Therefore, the output signal of the comparator 41A can be supplied to the control circuit 50 as the signal HYSCOMP_H, and the output signal of the comparator 42A can be supplied to the control circuit 50 as the signal HYSCOMP_L.

In the circuit of FIG. 14, it is necessary to use both the P-channel FET and the N-channel FET for forming the plurality of constant current sources. However, by adopting the circuit structure as illustrated in FIG. 15, all the constant current sources 411 to 414 can be formed by the same type of FETs. Therefore, characteristics of the FET for forming the constant current can be equalized among a plurality of constant current sources, and hence the center of the oscillation of the feedback voltage VFB can accurately coincide with the reference voltage VREF (namely, the output voltage V0 can accurately coincide with the desired voltage).

Figure 16:
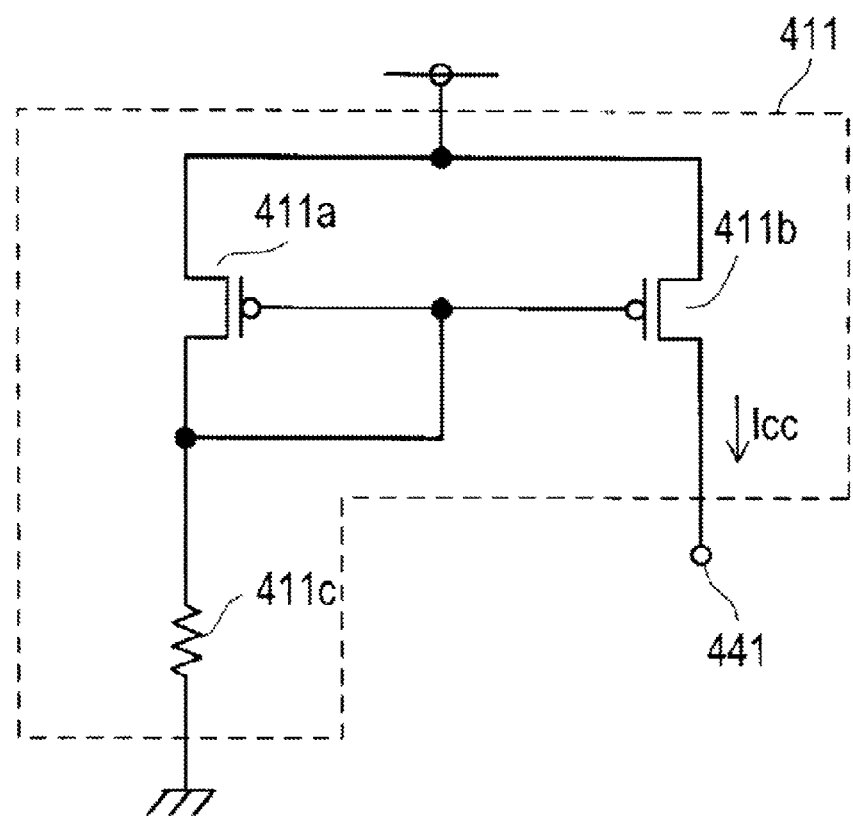
FIG. 16 is a circuit diagram of one constant current source illustrated in FIG. 15.

The constant current sources 411 to 414 are formed by using FETs having the same characteristics. The constant current sources 411 to 414 have the same circuit structure. Therefore, as a typical one, an example of the internal circuit diagram of the constant current source 411 is illustrated in FIG. 16. The constant current source 411 can be formed of P-channel MOSFETs 411a and 411b, and a resistor 411c. The sources of the FETs 411a and 411b are commonly connected, and the gates of the FETs 411a and 411b are commonly connected. The sources of the FETs 411a and 411b are applied with a predetermined positive DC voltage, and the gate and the drain are short circuited in the FET 411a. The drain of the FET 411a is connected to the ground via the resistor 411c. The FETs 411a and 411b have the same characteristics. The FETs 411a and 411b form the current mirror circuit, and drain current of the FET 411b functions as the constant current ICC.

Fifth Embodiment

Figure 17:
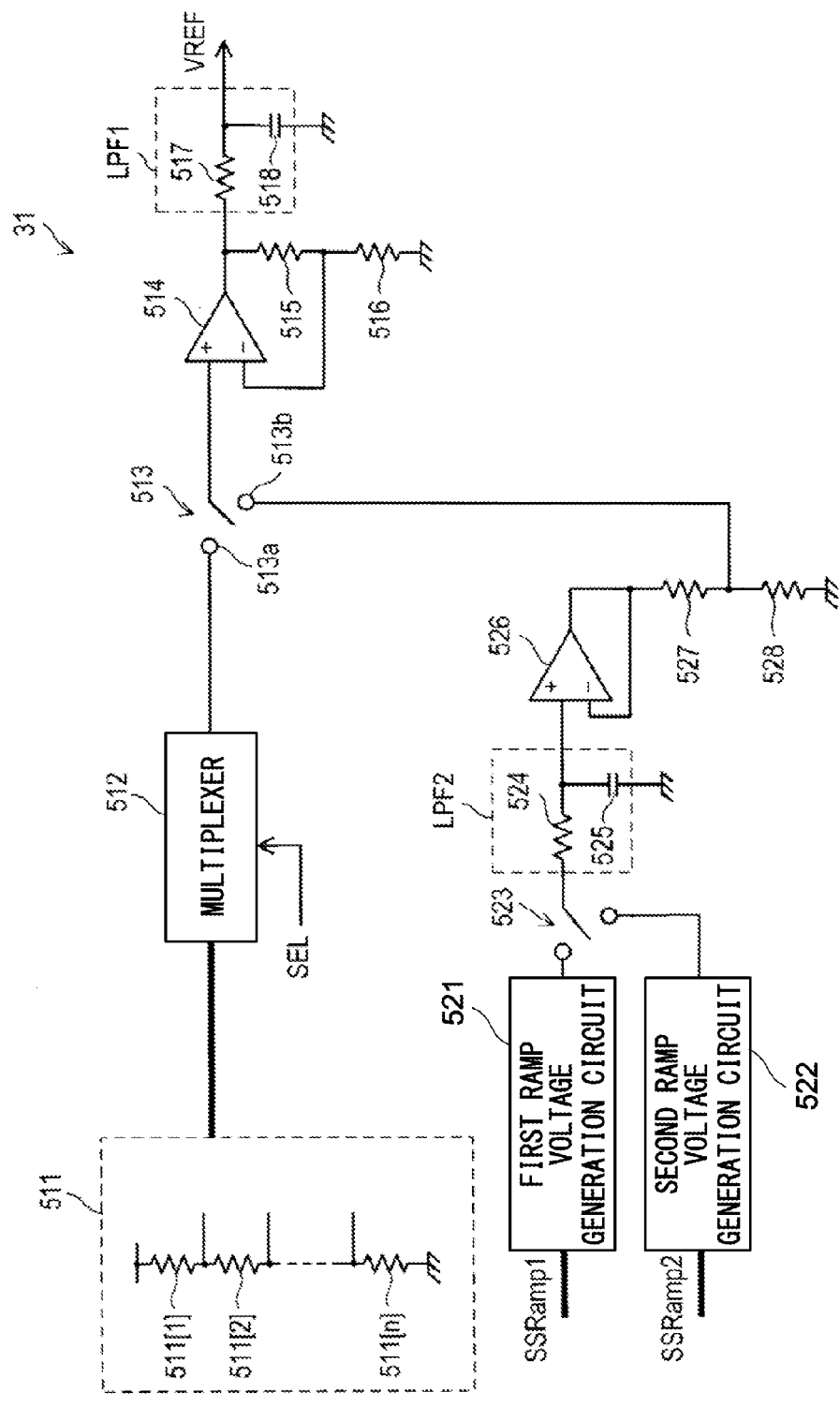
FIG. 17 is a circuit diagram related to generation of the reference voltage according to a fifth embodiment of the present invention.

A fifth embodiment of the present invention is described. In the fifth embodiment, a detailed structural example of the reference voltage generation circuit 30 (see FIG. 1) is described. In the power supply circuit using the IC 10, a so-called soft start control for gently increasing the output voltage Vo during starting can be performed. FIG. 17 illustrates a detailed structure of the DAC 31 (see FIG. 1) capable of realizing the soft start control. The DAC 31 illustrated in FIG. 17 can be applied to the first to fourth embodiments.

The DAC 31 includes the circuit elements illustrated in FIG. 17. A resistance value group 511 is a serial circuit of n resistors 511[1] to 511[n], and a predetermined positive DC voltage is applied to this serial circuit. This serial circuit has total (n−1) nodes between neighboring resistors, and total (n−1) voltages at the total (n−1) nodes are supplied to a multiplexer 512. Here, n is an integer of 2 or larger, and for example, "(n−1)=32" holds. The multiplexer 512 selects one of the total (n−1) voltages from the resistance value group 511 based on a selection signal SEL, and the selected voltage is output to a first input terminal 513a of a switch 513. The switch 513 selects a voltage applied to the first input terminal 513a or a second input terminal 513b of itself and supplies the selected voltage to the noninverting input terminal of an operational amplifier 514. An output voltage of the operational amplifier 514 is applied to a serial circuit of resistors 515 and 516, and the node between the resistors 515 and 516 is connected to the inverting input terminal of the operational amplifier 514. In other words, the operational amplifier 514 amplifies the input voltage to the noninverting input terminal by an amplification factor depending on resistance values of the resistors 515 and 516. The output voltage of the operational amplifier 514 is supplied to the noninverting input terminal of the amplifier 32 (see FIG. 1) as the reference voltage VREF via a low pass filter LPF1 constituted of a resistor 517 and a capacitor 518. The low pass filter LPF1 is disposed mainly for removing glitch that can be generated when the switch 513 works.

A first ramp voltage generation circuit 521 is constituted of a D/A converter for converting a digital ramp signal SSRamp1 into an analog signal and outputs the analog voltage converted from the ramp signal SSRamp1. A second ramp voltage generation circuit 522 is constituted of a D/A converter for converting a digital ramp signal SSRamp2 into an analog signal and outputs the analog voltage converted from the ramp signal SSRamp2. A switch 523 selects an output voltage of the circuit 521 or an output voltage of the circuit 522 and supplies the selected voltage to the noninverting input terminal of an operational amplifier 526 via a low pass filter LPF2 constituted of a resistor 524 and a capacitor 525. An output terminal of the operational amplifier 526 is connected to the inverting input terminal of the operational amplifier 526. In addition, an output voltage of the operational amplifier 526 is applied to a serial circuit of resistors 527 and 528, and the node between the resistors 527 and 528 is connected to the second input terminal 513b of the switch 513.

The host block 80 illustrated in FIG. 6 outputs the selection signal SEL, the ramp signals SSRamp1 and SSRamp2, and controls the selected state of the switches 513 and 523, under instruction of the main processor 110.

In the soft start control when the power supply circuit (1, 1a, or 1b) starts, the host block 80 supplies the voltage at the input terminal 513b to the noninverting input terminal of the operational amplifier 514, supplies the output voltage of the circuit 521 or 522 to the noninverting input terminal of the operational amplifier 526 via the switch 523 and the low pass filter LPF2, and in this state, increases a digital value of the ramp signal (SSRamp1 or SSRamp2) from zero to a predetermined upper limit value in a certain period. After that, the host block 80 switches the switch 513 so as to switch the input voltage at the noninverting input terminal of the operational amplifier 514 to the output voltage of the multiplexer 512. When this switching is completed, the soft start control is completed. Therefore, the output voltage of the multiplexer 512 has a voltage value corresponding to a target value of a stable voltage of the output voltage Vo, and the upper limit value of the ramp signal is set based on the voltage value. Note that the reference voltage VREF in the description of the first to fourth embodiments corresponds to VREF after the soft start control is completed, but may be VREF during execution of the soft start control.

Variations

The embodiments of the present invention can be variously modified as necessary within a scope of the technical concept recited in the claims. The embodiments described above are merely examples of the embodiment of the present invention, and the present invention and meanings of the elements are not limited to those described above in the embodiments. The specific values indicated in the above description are merely examples, and they can be changed to various values as a matter of course. As annotations that can be applied to the above embodiments, there are described Note 1 to Note 4 as below. The descriptions of the individual Notes can be arbitrarily combined as long as no contradiction arises.

[Note 1]

There is described above the structure in which the two output circuits 20 are driven in parallel so as to obtain one output voltage Vo. However, it is possible to form the power supply circuit in which three or more output circuits 20 are disposed in the IC 10, and the three or more output circuits 20 are driven in parallel so that the output voltage Vo is obtained. For instance, when first to third output circuits 20 are disposed in the IC 10, the control circuit 50 can operate by using the above-mentioned first mode or second mode, or a third mode in which the first to third output circuits 20 are used for generating the output voltage Vo, as the real operation mode.

In the third mode, similarly to the second mode, the control circuit 50 should perform ON/OFF control of the total six FETs (21 and 22) so that the FETs 21 of the first to third output circuits 20 are turned on or off synchronously and the FETs 22 of the first to third output circuits 20 are turned on or off synchronously (synchronous ON/OFF control). However, when the real operation mode is switched from the first or second mode to the third mode, it is preferred to inhibit the operation of the third mode from starting in the state where the FETs 22 of the individual output circuits 20 are turned on. Further, in the third mode too, similarly to the second mode, the FETs 21 of the first and second output circuits 20 are turned on or off synchronously, and the FETs 22 of the first and second output circuits 20 are turned on or off synchronously. Therefore, the third mode can be considered as a type of the second mode.

[Note 2]

Figure 18:
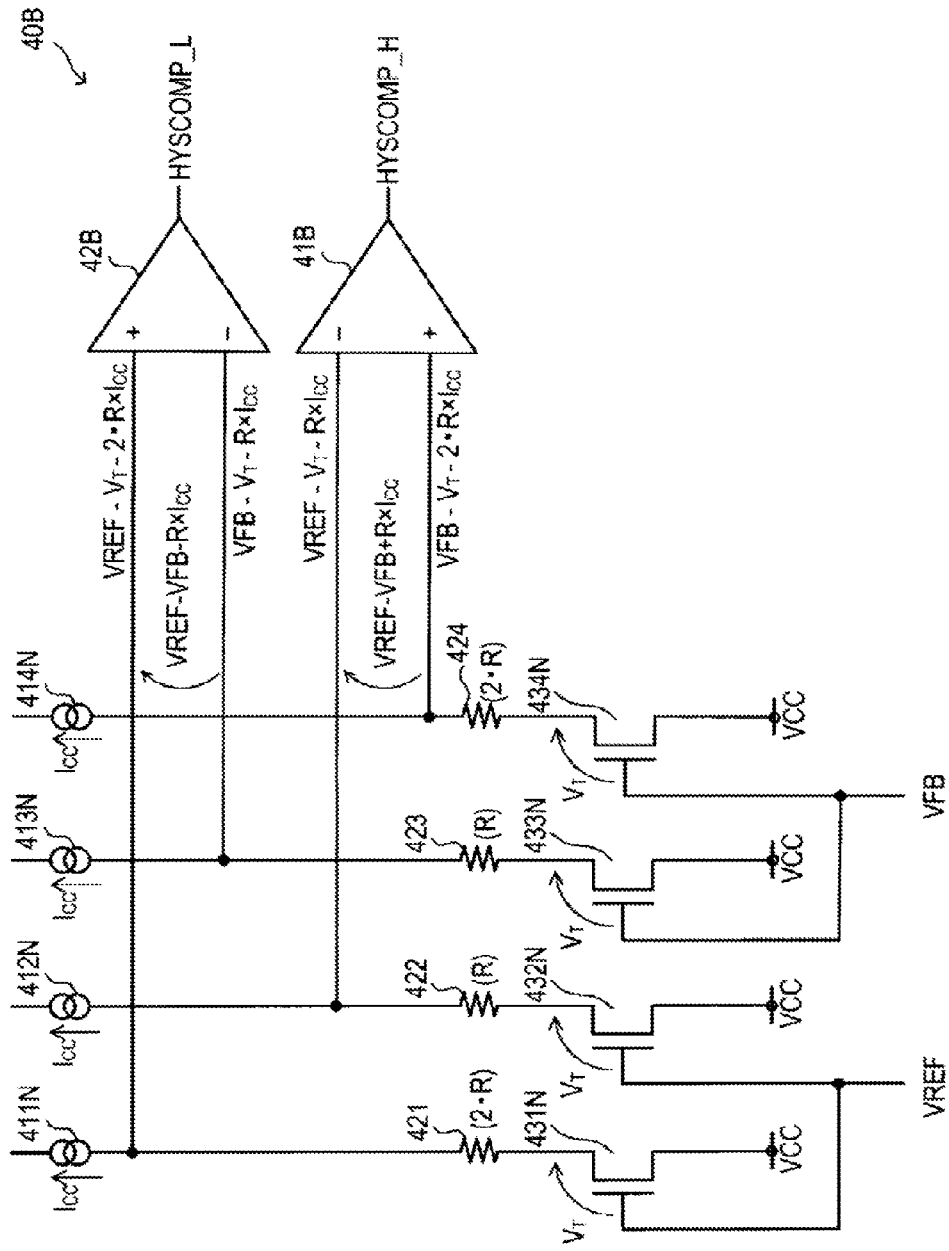
FIG. 18 illustrates a modified circuit diagram of the comparing circuit of FIG. 15.
Figure 19:
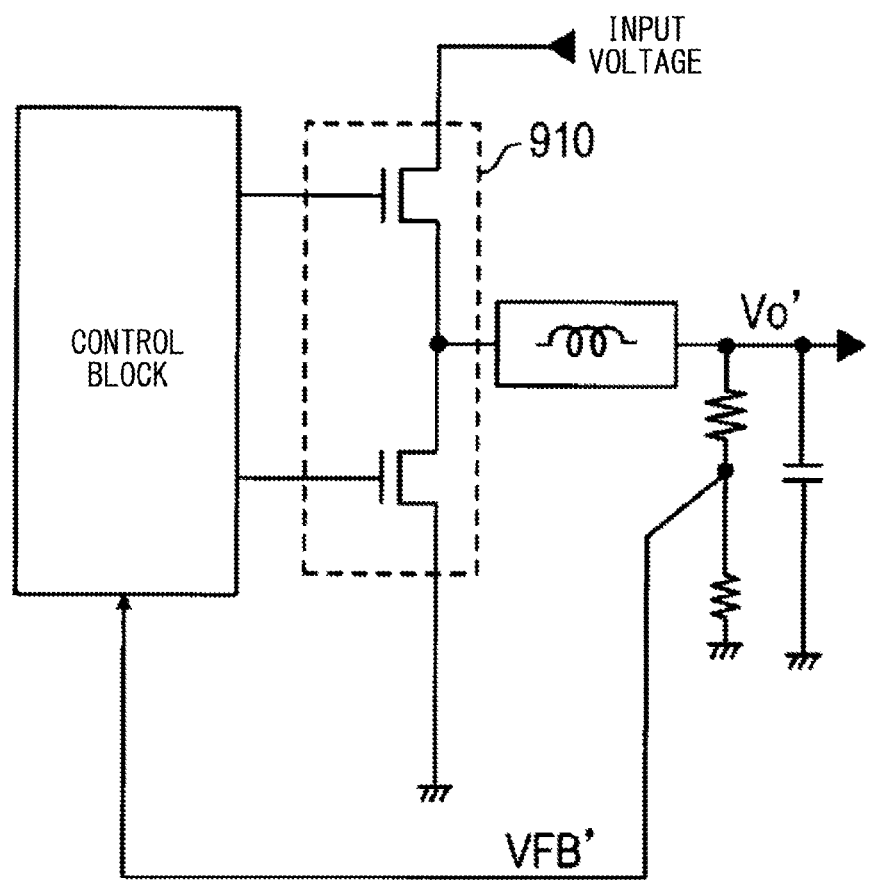
FIG. 19 is a schematic diagram of a conventional power supply circuit.
Figure 20:
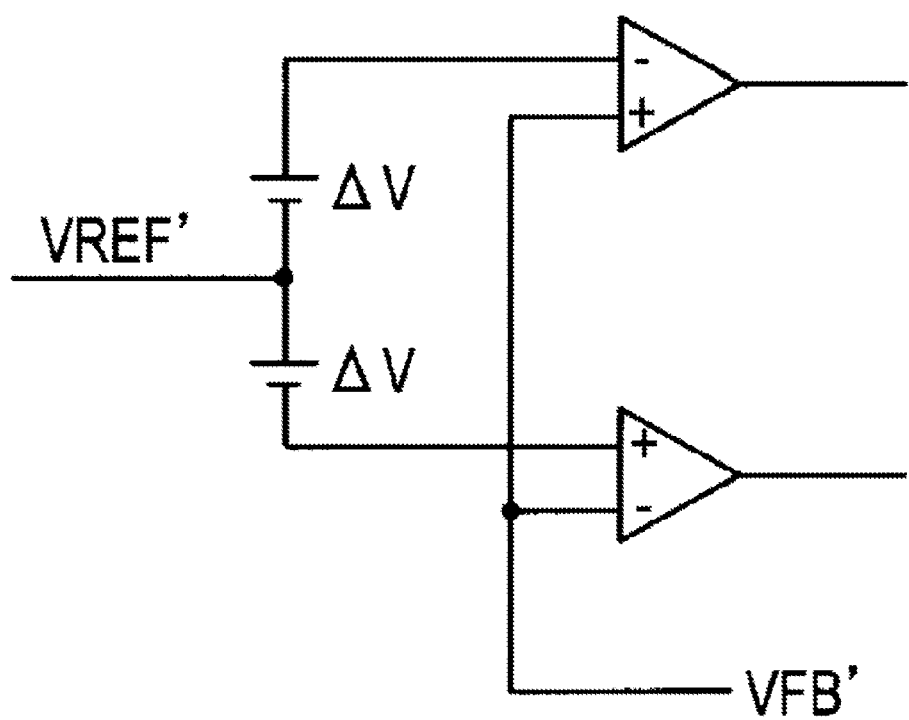
FIG. 20 is a circuit diagram of a comparing circuit using a feedback voltage related to the power supply circuit of FIG. 19.

It is possible to change the above-mentioned circuits as necessary so that an N-channel FET is replaced with a P-channel FET, or a P-channel FET is replaced with an N-channel FET. For instance, the FETs 431 to 434 illustrated in FIG. 15 may be changed to FETs 431N to 434N as N-channel MOSFETs, and then the comparing circuit 40A illustrated in FIG. 15 is deformed into a comparing circuit 40B illustrated in FIG. 18. It is possible to use the comparing circuit 40B as the comparing circuit 40 of the power supply circuit (1, 1a, or 1b).

The drains of the FETs 431N to 434N are applied with the positive DC voltage VCC higher than the reference voltage VREF or the feedback voltage VFB. The gates of the FETs 431N and 432N are applied with the reference voltage VREF, and the gates of the FETs 433N and 434N are applied with the feedback voltage VFB. The FETs 431N to 434N are respectively connected via the resistors 421 to 424 to constant current sources 411N to 414N for supplying constant current ICC. Each of the constant current sources 411N to 414N is constituted of a current mirror circuit using N-channel MOSFETs.

A comparator 42B compares a potential lower than a source potential (potential with respect to the ground) of the FET 431N by a voltage drop of the resistor 421 with a potential lower than a source potential (potential with respect to the ground) of the FET 433N by a voltage drop of the resistor 423, so that the signal HYSCOMP_L can be generated. Similarly, a comparator 41B compares a potential lower than a source potential (potential with respect to the ground) of the FET 432N by a voltage drop of the resistor 422 with a potential lower than a source potential (potential with respect to the ground) of the FET 434N by a voltage drop of the resistor 424, so that the signal HYSCOMP_H can be generated.

[Note 3]

The MOSFET in each circuit described above can be replaced with a junction field-effect transistor (JFET) or a bipolar transistor. When a bipolar transistor is used instead of an MOSFET, the gate, the drain, and the source in the above description should be read as a base (control terminal), a collector, and an emitter, respectively.

[Note 4]

For instance, it is possible to consider as follows. The IC 10 is a semiconductor device including an integrated circuit for forming the power supply circuit (1, 1a, or 1b) described above. The electronic appliance 100 illustrated in FIG. 6 includes the semiconductor device. The IC 10 may further include other circuit than the circuit for forming the power supply circuit (1, 1a, or 1b) described above (for example, a circuit for other power supply circuit).

What is claimed is:

1. A power supply circuit for generating an output voltage from an input voltage, comprising:
    a plurality of output circuits each of which includes a serial circuit of a first switching element connected to a terminal to which the input voltage is applied and a second switching element connected to a reference potential line, and is capable of generating a voltage to be a base of the output voltage from a node between the first and second switching elements; and
    a control circuit configure to control ON/OFF of the first and second switching elements of each output circuit based on a feedback voltage corresponding to the output voltage, wherein
    the control circuit operates in one of a plurality of modes including a first mode in which only a first output circuit is used between the first and second output circuits included in the plurality of output circuits for generating the output voltage and a second mode in which the first and second output circuits are used for generating the output voltage, and
    when changing from operation in the first mode to operation in the second mode, start of the operation in the second mode in a state where the second switching elements of the output circuits are turned on is inhibited.

2. The power supply circuit according to claim 1, wherein in the second mode, the control circuit performs synchronous control of the switching elements so that the first switching elements of the output circuits are turned on or off synchronously, and that the second switching elements of the output circuits are turned on or off synchronously.

3. The power supply circuit according to claim 2, further comprising a mode instruction circuit configured to generate a mode switching signal for instructing to switch from the first mode to the second mode, wherein
    when the control circuit receives an input of the mode switching signal during turning on of the first switching element of the first output circuit, the control circuit starts the synchronous control from input timing of the mode switching signal, and
    when the control circuit receives an input of the mode switching signal during turning on of the second switching element of the first output circuit, the control circuit waits to execute the synchronous control until a signal for turning on the first switching element of the first output circuit is output.

4. The power supply circuit according to claim 1, further comprising:
 a reference voltage generation circuit configured to generate a reference voltage; and
 a comparing circuit configured to generate a first comparison result signal indicating a comparison result between a voltage higher than the reference voltage by a predetermined first hysteresis voltage and the feedback voltage, and a second comparison result signal indicating a comparison result between a voltage lower than the reference voltage by a predetermined second hysteresis voltage and the feedback voltage, wherein
 the control circuit controls ON/OFF of the first and second switching elements based on the first and second comparison result signals, and
 in the comparing circuit, the reference voltage is applied to control terminals of first and second transistors, while the feedback voltage is applied to control terminals of third and fourth transistors, and constant current is supplied to each of the first to fourth transistors via a resistor so as to generate first to fourth voltages, which are used for generating the first and second comparison result signals.

5. The power supply circuit according to claim 4, wherein in the comparing circuit, the reference voltage is applied to the control terminals of the first and second transistors, and constant current is supplied to each of the first and second transistors via a resistor so as to generate the first and second voltages, the feedback voltage is applied to the control terminals of the third and fourth transistors, and constant current is supplied to each of the third and fourth transistors via a resistor so as to generate the third and the fourth voltages, and the first and second comparison result signals are generated by comparison between the first and third voltages and comparison between the second and fourth voltages.

6. The power supply circuit according to claim 4, wherein
 the same type of four transistors are used as the first to fourth transistors, and
 four constant currents supplied to the first to fourth transistors are all generated by a current mirror circuit constituted of the same type of transistors.

7. The power supply circuit according to claim 5, wherein
 the same type of four transistor are used as the first to fourth transistors, and
 four constant currents supplied to the first to fourth transistors are all generated by a current mirror circuit constituted of the same type of transistors.

8. A semiconductor device comprising an integrated circuit for forming the power supply circuit according to claim 1.

9. An electronic appliance comprising a semiconductor device according to claim 8.

10. A magnetic disk device comprising:
 a semiconductor device according to claim 8; and
 a signal processor configured to perform signal processing on data of a magnetic disk using the output voltage of the power supply circuit formed by using the semiconductor device.

11. A power supply circuit for generating an output voltage from an input voltage, comprising:
 an output circuit including first and second switching elements connected in series to each other to which the input voltage is applied, configured to generate a voltage to be a base of the output voltage from a node between the first and second switching elements;
 a reference voltage generation circuit configured to generate a reference voltage;
 a comparing circuit configured to generate a first comparison result signal indicating a comparison result between a voltage higher than the reference voltage by a predetermined first hysteresis voltage and a feedback voltage corresponding to the output voltage, and a second comparison result signal indicating a comparison result between a voltage lower than the reference voltage by a predetermined second hysteresis voltage and the feedback voltage; and
 a control circuit configured to control ON/OFF of the first and second switching elements based on the first and second comparison result signals; wherein
 in the comparing circuit, the reference voltage is applied to control terminals of first and third transistors, while the feedback voltage is applied to control terminals of second and fourth transistors, and constant current is supplied to each of the first to fourth transistors via a resistor so as to generate first to fourth voltages, which are used for generating the first and second comparison result signals.

12. The power supply circuit according to claim 11, wherein in the comparing circuit, the reference voltage is applied to the control terminals of the first and second transistors, and constant current is supplied to each of the first and second transistors via a resistor so as to generate the first and second voltages, the feedback voltage is applied to control terminals of the third and fourth transistors, and constant current is supplied to each of the third and fourth transistors via a resistor so as to generate the third and the fourth voltages, and the first and second comparison result signals are generated by comparison between the first and third voltages and comparison between the second and fourth voltages.

13. The power supply circuit according to claim 11, wherein
 the same type of four transistors are used as the first to fourth transistors, and
 four constant currents supplied to the first to fourth transistors are all generated by a current mirror circuit constituted of the same type of transistors.

14. The power supply circuit according to claim 12, wherein
 the same type of four transistors are used as the first to fourth transistors, and
 four constant currents supplied to the first to fourth transistors are all generated by a current mirror circuit constituted of the same type of transistors.

* * * * *